United States Patent
Kim et al.

(10) Patent No.: US 9,199,545 B2
(45) Date of Patent: *Dec. 1, 2015

(54) METHOD AND APPARATUS FOR CONTROLLING WIRELESS POWER TRANSMISSION

(75) Inventors: Nam Yun Kim, Seoul (KR); Sang Wook Kwon, Seongnam-si (KR); Yun Kwon Park, Dongducheon-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 689 days.

This patent is subject to a terminal disclaimer.

(21) Appl. No.: 13/485,053

(22) Filed: May 31, 2012

(65) Prior Publication Data

US 2012/0306286 A1 Dec. 6, 2012

Related U.S. Application Data

(60) Provisional application No. 61/491,953, filed on Jun. 1, 2011.

(30) Foreign Application Priority Data

Aug. 5, 2011 (KR) .......................... 10-2011-0078079

(51) Int. Cl.
*B60L 11/18* (2006.01)
*H02J 7/00* (2006.01)
*H02J 7/02* (2006.01)
*H01F 27/42* (2006.01)

(52) U.S. Cl.
CPC ............... *B60L 11/182* (2013.01); *H02J 7/007* (2013.01); *H02J 7/025* (2013.01); *Y02T 10/7005* (2013.01); *Y02T 90/122* (2013.01); *Y02T 90/14* (2013.01)

(58) Field of Classification Search
USPC .......................................................... 307/104
See application file for complete search history.

(56) References Cited

U.S. PATENT DOCUMENTS

2011/0074347 A1   3/2011   Karalis et al.

FOREIGN PATENT DOCUMENTS

| JP | 2004-248365 A | 9/2004 |
| JP | 2007-089341 A | 4/2007 |
| KR | 10-2011-0009227 A | 1/2011 |
| KR | 10-2011-0009228 A | 1/2011 |
| KR | 10-2011-0010105 A | 1/2011 |

OTHER PUBLICATIONS

U.S. Appl. No. 13/484,422, filed May 2012, Kim et al.*

* cited by examiner

*Primary Examiner* — Robert Deberadinis
(74) *Attorney, Agent, or Firm* — NSIP Law

(57) ABSTRACT

A method and apparatus for controlling wireless power transmission are provided. An output power of a source device may be wirelessly transmitted to a target device via a resonator. The source device may detect a change in a current of the output power, and may request the target device to verify a state of the target device. The source device may determine a state of a wireless power transmission based on the change in the current and the state of the target device. The source device may control wireless power transmission based on the determined state of the wireless power transmission.

23 Claims, 30 Drawing Sheets

1200

1500

FIG. 17
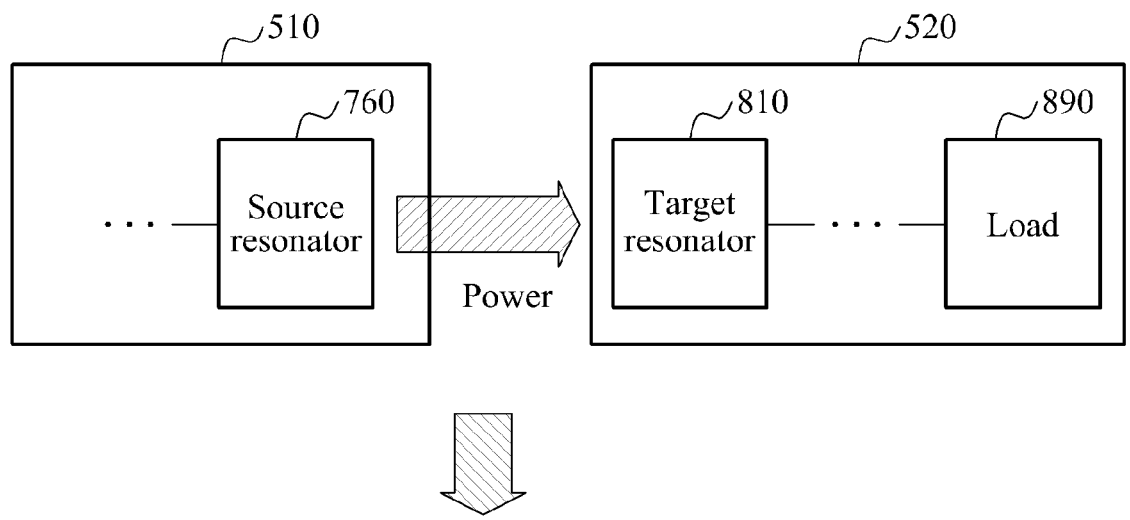
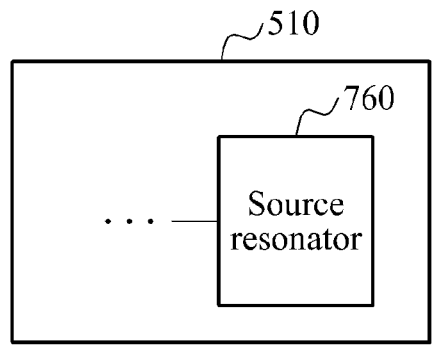

FIG. 19
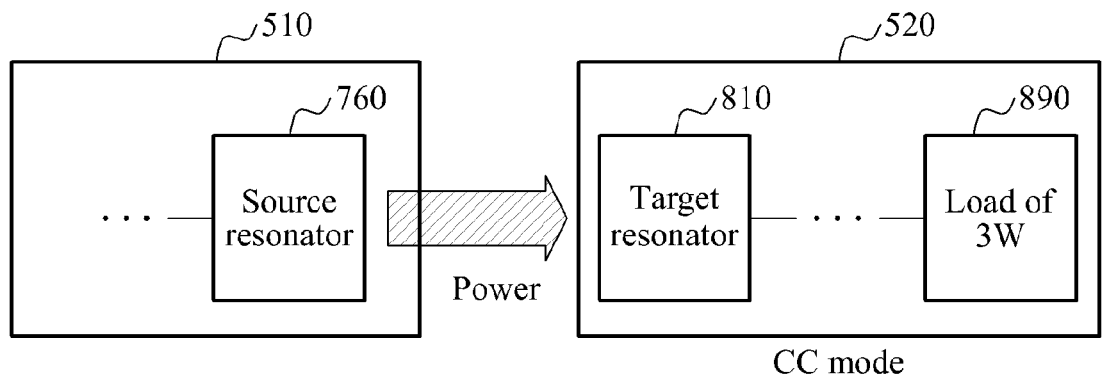
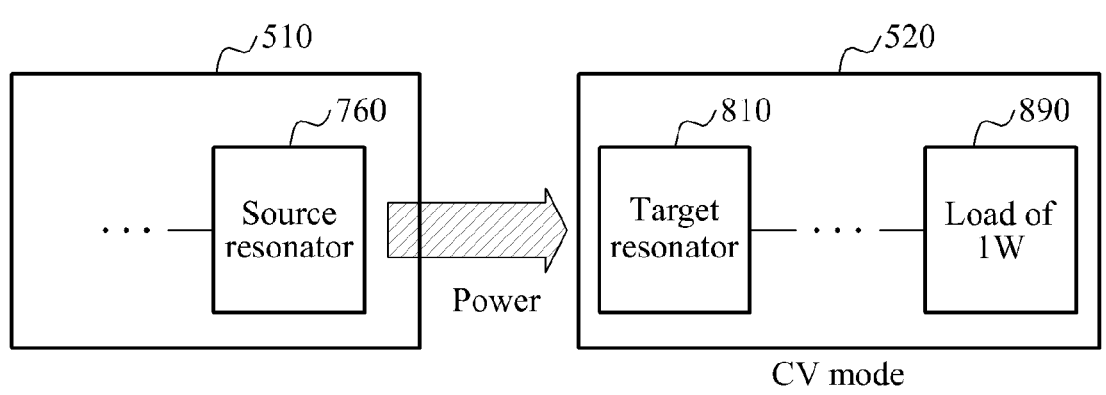

METHOD AND APPARATUS FOR CONTROLLING WIRELESS POWER TRANSMISSION

CROSS-REFERENCE TO RELATED APPLICATION(S)

This application claims the benefit under 35 U.S.C. §119(e) of U.S. Provisional Application No. 61/491,953, filed on Jun. 1, 2011, in the United States Patent and Trademark Office, and claims the benefit under 35 U.S.C. §119(a) of Korean Patent Application No. 10-2011-0078079, filed on Aug. 5, 2011, in the Korean Intellectual Property Office, the entire disclosures of which are each incorporated herein by reference for all purposes.

BACKGROUND

1. Field

The following description relates to a method and apparatus for wirelessly transmitting power.

2. Description of Related Art

Wireless power is energy that may be transferred from a wireless power transmitter to a wireless power receiver through magnetic coupling. Generally, a wireless power transmission and charging system includes a source device and a target device. The source device may wirelessly transmit power, and the target device may wirelessly receive power. In this example, the source device is referred to as a wireless power transmitter and the target device is referred to as a wireless power receiver.

Typically a source device includes a source resonator, and the target device includes a target resonator. Magnetic coupling or resonance coupling may occur between the source resonator and the target resonator.

A single source device may transmit power to a plurality of target devices. For example, if a plurality of target devices simultaneously approach a resonator of a source device, or the plurality of target devices are located near the resonator of the source device, data collision may occur due to the plurality of target devices when power is supplied to the source device during an operation for initial connection. Accordingly, a normal charging operation may not be performed.

SUMMARY

In one general aspect, there is provided a wireless power transmitter, including a controller configured to determine an output power, a power converter configured to output the output power, a resonator configured to wirelessly transmit the output power to a target device, and a power detector configured to detect a current of the output power, wherein the controller is further configured to detect a change in the current using the power detector, determine a state of a wireless power transmission based on the detected change in the current, and control an operation for the wireless power transmission to the target device based on the determined state of the wireless power transmission.

The controller may be further configured to receive a state of the target device from the target device, and to determine the state of wireless power transmission based on the detected change in the current and the received state of the target device.

In response to the current being changed within a predetermined period of time, the controller may determine that the current remains unchanged.

In response to the current being changed within a predetermined range, the controller may determine that the current remains unchanged.

In response to the current being changed for more than a predetermined period of time, the controller may be configured to request the target device to transmit a state of the target device.

The controller may be configured to control the operation of the wireless power transmission by adjusting the output power based on the received state of the target device.

In response to the current being changed to a current corresponding to a load indicating that the target device has been removed, the controller may control the operation for the wireless power transmission by interrupting an output of the output power.

In response to the current corresponding to a load that occurs when the target device has changed from a constant current (CC) mode to a constant voltage (CV) mode, or if the received state of the target device indicates that the target device has changed from the CC mode to the CV mode, the controller may control the operation for the wireless power transmission by reducing the output power.

A plurality of target devices may be provided, the controller may receive states of the plurality of target devices, respectively, from the plurality of target devices, and may determine the state of the wireless power transmission based on the received states and the change in the current.

In response to the current being reduced, and in response to the received states of the target devices comprising at least one of a state indicating that a part of, or all of the target devices are changed in charging state from a constant current (CC) mode to a CV mode, a state indicating that at least one target device is removed from among the target devices, and a state indicating that at least one target device among the target devices is completely charged, the controller may control the operation for the wireless power transmission by reducing the output power that is transmitted to the target devices.

In response to the current being increased and a target device being added to the target devices, the controller may control the operation for the wireless power transmission by increasing the output power so that the output power is transmitted to the added target device.

In another aspect, there is provided a method of controlling a wireless power transmission, the method including wirelessly transmitting an output power to a target device, detecting a change in a current of the output power, determining a state of a wireless power transmission based on the detected change in the current, and controlling an operation for the wireless power transmission based on the determined state of the wireless power transmission.

The method may further comprise receiving a state of the target device from the target device, and the determining may comprise determining the state of the wireless power transmission based on the detected change in the current and the received state of the target device.

In response to the current being changed within a predetermined period of time, the current may be determined to remain unchanged.

In response to the current being changed within a predetermined range, the current may be determined to remain unchanged.

The method may further comprise requesting the target device to transmit a state of the target device, in response to the current being changed for more than a predetermined period of time.

The controlling may comprise adjusting the output power based on the received state of the target device.

The controlling may comprise interrupting an output of the output power, in response to the current being changed to a current corresponding to a load indicating that the target device has been removed.

In response to the current corresponding to a load that occurs when the target device has changed from a constant current (CC) mode to a constant voltage (CV) mode, or if the received state of the target device indicates that the target device has changed from the CC mode to the CV mode, the controlling may comprise controlling the operation for the wireless power transmission by reducing the output power.

A plurality of target devices are provided, the receiving may comprise receiving states of the plurality of target devices, respectively, from the plurality of target devices, and the determining may comprise determining the state of the wireless power transmission based on the received states and the change in the current.

In response to the current being reduced, and in response to the states of the target devices comprising at least one of a state indicating that a part of, or all of the target devices are changed in charging state from a constant current (CC) mode to a CV mode, a state indicating that at least one target device is removed from among the target devices, and a state indicating that at least one target device among the target devices is completely charged, the controlling may comprise controlling the operation for the wireless power transmission by reducing the output power.

In response to the current being increased, and a target device being added to the target devices, the controlling may comprise increasing the output power so that the output power is transmitted to the added target device.

In another aspect, there is provided a computer-readable storage medium having stored therein instructions to cause a processor to implement a method of controlling a wireless power transmission, the method including wirelessly transmitting an output power to a target device, detecting a change in a current of the output power, determining a state of a wireless power transmission based on the detected change in the current, and controlling an operation for the wireless power transmission based on the determined state of the wireless power transmission.

Other features and aspects will be apparent from the following detailed description, the drawings, and the claims.

BRIEF DESCRIPTION OF THE DRAWINGS

FIG. 17 is a diagram illustrating an example in which a load is removed during charging of a single target device.

FIG. 19 is a diagram illustrating an example of a change in a mode of a target device that is being charged.

Figure 1:
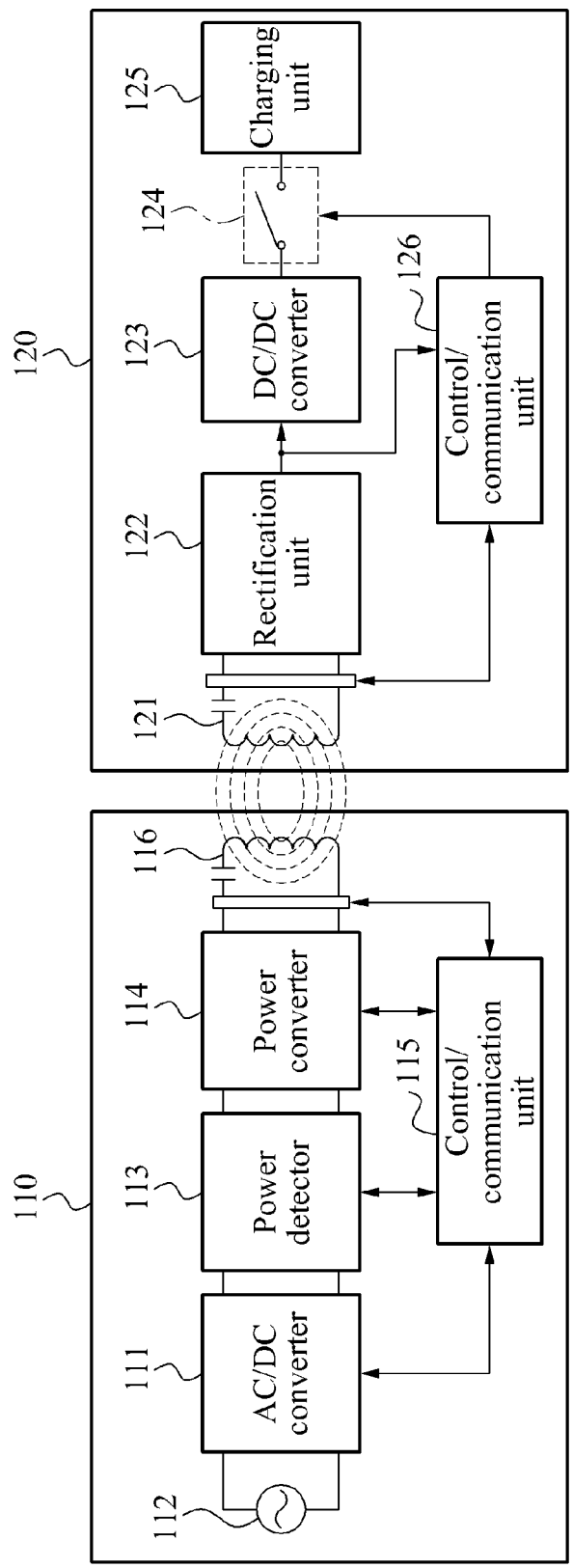
FIG. 1 is a diagram illustrating an example of a wireless power transmission and charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Various examples herein are directed towards wireless power transmission and reception. The source and target devices described herein may be or may be included in a terminal. For example, the terminal may include a mobile phone, a computer, a tablet, an appliance, and the like. As an example, the target device may be a terminal and the source device a charging station that may be used to wireless supply power to the terminal.

FIG. 1 illustrates an example of a wireless power transmission and charging system.

Referring to FIG. 1, the wireless power transmission and charging system includes a source device 110, and a target device 120.

In this example, the source device 110 includes an alternating current-to-direct current (AC/DC) converter 111, a power supply 112, a power detector 113, a power converter 114, a control and communication (control/communication) unit 115, and a source resonator 116. The target device 120 includes a target resonator 121, a rectification unit 122, a DC-to-DC (DC/DC) converter 123, a switch unit 124, a charging unit 125, and a control/communication unit 126.

The AC/DC converter 111 may generate a DC voltage by rectifying an AC voltage, for example, in a band of tens of hertz (Hz) or more that are output from the power supply 112. The AC/DC converter 111 may output a DC voltage of a predetermined level, or may adjust an output level of a DC voltage, for example, based on the control of the control/communication unit 115.

The power detector 113 may detect an output current and an output voltage of the AC/DC converter 111, and may transfer information about the detected current and the detected voltage to the control/communication unit 115. Additionally, the power detector 113 may detect an input current and an input voltage of the power converter 114.

The power converter 114 may generate a power by converting a DC voltage of a predetermined level to an AC voltage, for example, using a switching pulse signal in a band of a few kilohertz (KHz) to tens of megahertz (MHz). For example, the power converter 114 may convert a DC voltage supplied to a power amplifier (PA) to an AC voltage, using a reference resonant frequency $F_{Ref}$, and may generate a communication power used for communication, or a charging power used for charging. The communication power or the charging power may be used in a plurality of target devices.

The communication power may refer to low power of 0.1 milliwatt (mW) to 1 mW, and the charging power may refer to high power of 1 mW to 200 W which is consumed in a device load of a target device. In various examples described herein, the term "charging" may be used to refer to supplying power to a unit or element that is configured to charge power. Additionally, the term "charging" may be used to refer to supplying power to a unit or element that is configured to consume power. The units or elements may include, for example, batteries, displays, sound output circuits, main processors, and various sensors.

Also, the term "reference resonant frequency" may be used to refer to a resonant frequency that is used by the source device 110. Additionally, the term "tracking frequency" may be used to refer to a resonant frequency that is adjusted by a preset scheme.

The control/communication unit 115 may detect a reflected wave of the communication power or the charging power, and may detect mismatching that may occur between the target resonator 121 and the source resonator 116 based on the detected reflected wave. To detect the mismatching, for example, the control/communication unit 115 may detect an envelope of the reflected wave, a power amount of the reflected wave, and the like. The control/communication unit 115 may compute a voltage standing wave ratio (VSWR), based on a voltage level of the reflected wave, and based on a level of an output voltage of the source resonator 116 or the power converter 114. For example, if the VSWR is less than a predetermined value, the control/communication unit 115 may determine that mismatching occurs. In this example, the control/communication unit 115 may compute a power transmission efficiency for each of N tracking frequencies, may determine a tracking frequency $F_{Best}$ with the best power transmission efficiency among the N tracking frequencies, and may adjust the reference resonant frequency $F_{Ref}$ to the tracking frequency $F_{Best}$. In various examples, the N tracking frequencies may be set in advance.

The control/communication unit 115 may control a frequency of a switching pulse signal. Under the control of the control/communication unit 115, the frequency of the switching pulse signal may be determined. For example, by controlling the power converter 114, the control/communication unit 115 may generate a modulation signal to be transmitted to the target device 120. In other words, the control/communication unit 115 may transmit various messages to the target device 120 using in-band communication. The control/communication unit 115 may detect a reflected wave, and may demodulate a signal received from the target device 120 through an envelope of the detected reflected wave.

The control/communication unit 115 may generate a modulation signal for in-band communication. For example, the control/communication unit 115 may generate the modulation signal by turning on or off a switching pulse signal, by performing delta-sigma modulation, and the like. Additionally, the control/communication unit 115 may generate a pulse-width modulation (PWM) signal with a predetermined envelope.

The control/communication unit 115 may also perform out-band communication that employs a communication channel. For example, the control/communication unit 115 may include a communication module, such as a ZigBee module, a BLUETOOTH® module, and the like. The control/communication unit 115 may transmit or receive data to or from the target device 120 through the out-band communication.

The source resonator 116 may transfer an electromagnetic energy to the target resonator 121. For example, the source resonator 116 may transfer the communication power or charging power to the target device 120, using a magnetic coupling with the target resonator 121.

The target resonator 121 may receive the electromagnetic energy from the source resonator 116. For example, the target resonator 121 may receive the communication power or charging power from the source device 110, using the magnetic coupling with the source resonator 116. In various examples, the target resonator 121 may receive various messages from the source device 110 using the in-band communication.

The rectification unit 122 may generate a DC voltage by rectifying an AC voltage. The AC voltage may be received from the target resonator 121.

The DC/DC converter 123 may adjust a level of the DC voltage that is output from the rectification unit 122, for example, based on a capacitance of the charging unit 125. As an example, the DC/DC converter 123 may adjust the level of the DC voltage output from the rectification unit 122 from 3 volts (V) to 10 V.

The switch unit 124 may be turned on or off under the control of the control/communication unit 126. For example, if the switch unit 124 is turned off, the control/communication unit 115 of the source device 110 may detect a reflected wave. In other words, if the switch unit 124 is turned off, the magnetic coupling between the source resonator 116 and the target resonator 121 may be reduced or eliminated.

The charging unit 125 may include a battery. The charging unit 125 may charge the battery using a DC voltage output from the DC/DC converter 123.

The control/communication unit 126 may perform in-band communication for transmitting or receiving data using a resonant frequency. During the in-band communication, for example, the control/communication unit 126 may demodulate a received signal by detecting a signal between the target resonator 121 and the rectification unit 122, or by detecting an output signal of the rectification unit 122. In other words, the control/communication unit 126 may demodulate a message received through the in-band communication. The control/communication unit 126 may adjust an impedance of the target resonator 121, to modulate a signal to be transmitted to the source device 110. For example, the control/communication unit 126 may modulate the signal to be transmitted to the source device 110, by turning on or off the switch unit 124. As an example, the control/communication unit 126 may increase the impedance of the target resonator 121 such that a reflected wave may be detected by the control/communication unit 115 of the source device 110. In this example, depending on whether the reflected wave is detected, the control/communication unit 115 may detect a binary number "0" or "1."

The control/communication unit 126 may transmit a response message to the source device 110. For example, the response message may include a "type of a corresponding target device," "information about a manufacturer of a corresponding target device," "a model name of a corresponding target device," a "battery type of a corresponding target device," a "scheme of charging a corresponding target device," an "impedance value of a load of a corresponding target device," "information on characteristics of a target resonator of a corresponding target device," "information on a frequency band used by a corresponding target device," an "amount of a power consumed by a corresponding target device," an "identifier (ID) of a corresponding target device," "information on version or standard of a corresponding target device," and the like.

The control/communication unit 126 may perform out-band communication that employs a communication channel. For example, the control/communication unit 126 may include a communication module, such as a ZigBee module, a BLUETOOTH® module, and the like. The control/communication unit 126 may transmit or receive data to or from the source device 110 through the out-band communication.

The control/communication unit 126 may receive a wake-up request message from the source device 110, may detect an amount of a power received to the target resonator 121, and may transmit information about the detected amount of the power to the source device 110. The information about the detected amount may include, for example, an input voltage value and an input current value of the rectification unit 122, an output voltage value and an output current value of the rectification unit 122, an output voltage value and an output current value of the DC/DC converter 123, and the like.

In FIG. 1, the control/communication unit 115 may set a resonance bandwidth of the source resonator 116. Based on a setting of the resonance bandwidth of the source resonator 116, a Q-factor of the source resonator 116 may be determined.

Additionally, the control/communication unit 126 may set a resonance bandwidth of the target resonator 121. Based on a setting of the resonance bandwidth of the target resonator 121, a Q-factor of the target resonator 121 may be determined. For example, the resonance bandwidth of the source resonator 116 may be set to be wider or narrower than the resonance bandwidth of the target resonator 121. The source device 110 and the target device 120 may communicate with each other in order to share information about the resonance bandwidth of the source resonator 116 and the resonance bandwidth of the target resonator 121. In an example in which power desired or required by the target device 120 is higher than a reference value, the Q-factor of the source resonator 116 may be set to a value greater than "100." In another example in which the power desired or required by the target device 120 is lower than the reference value, the Q-factor of the source resonator 116 may be set to a value less than "100".

A Q-factor may consider a change in a distance between the source resonator 116 and the target resonator 121, a change in the resonance impedance, impedance mismatching, a reflected signal, and the like, and is represented by Qt. In this example, Qt may have an inverse-proportional relationship with the resonance bandwidth, as given by Equation 1.

$$\frac{\Delta f}{f_0} = \frac{1}{Qt}$$ [Equation 1]

$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 116 and the target resonator 121, $BW_S$ denotes the resonance bandwidth of the source resonator 116, and $BW_D$ denotes the resonance bandwidth of the target resonator 121.

An efficiency U of the wireless power transmission may be defined, as given in the example of Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa}$$ [Equation 2]

In Equation 2, $\kappa$ denotes a coupling coefficient of energy coupling between the source resonator 116 and the target resonator 121, $\Gamma_S$ denotes a reflection coefficient in the source resonator 116, $\Gamma_D$ denotes a reflection coefficient in the target resonator 121, $\omega_0$ denotes a resonant frequency, M denotes a mutual inductance between the source resonator 116 and the target resonator 121, $R_S$ denotes an impedance of the source resonator 116, $R_D$ denotes an impedance of the target resonator 121, $Q_S$ denotes the Q-factor of the source resonator 116, $Q_D$ denotes the Q-factor of the target resonator 121, and $Q_K$ denotes a Q-factor of the energy coupling between the source resonator 116 and the target resonator 121.

Referring to Equation 2, the Q-factors may have high relevance to the efficiency of the wireless power transmission. Accordingly, to increase the efficiency of the wireless power transmission, the Q-factors may be set to high values. For example, if the Q-factors $Q_S$ and $Q_D$ are set to extremely high values, the efficiency of the wireless power transmission may be reduced due to a change in the coupling coefficient $\kappa$, a change in the distance between the source resonator 116 and the target resonator 121, a change in the resonance impedance, impedance mismatching, and the like.

Additionally, to increase the efficiency of the wireless power transmission, if the resonance bandwidth of the source resonator 116, and the resonance bandwidth of the target resonator 121 are set to be excessively narrow, impedance mismatching and the like may occur due to even a small external effect. Considering the impedance mismatching, Equation 1 may be represented as given in Equation 3.

$$\frac{\Delta f}{f_0} = \frac{\sqrt{VSWR} - 1}{Qt\sqrt{VSWR}}$$ [Equation 3]

In an example in which an unbalanced relationship of a resonance bandwidth or a bandwidth of an impedance matching frequency between the source resonator 116 and the target resonator 121 is maintained, a reduction in efficiency of the wireless power transmission may be prevented due to a change in the coupling coefficient κ, a change in the distance between the source resonator 116 and the target resonator 121, a change in the resonance impedance, impedance mismatching, and the like. In an example in which the unbalanced relationship of the resonance bandwidth or the bandwidth of the impedance matching frequency between the source resonator 116 and the target resonator 121 is maintained, based on Equations 1 and 3, an unbalanced relationship between the Q-factors $Q_S$ and $Q_D$ may also be maintained.

Hereinafter, the term "resonator" in FIGS. 2A through 4B may include, for example, a source resonator, and a target resonator.

Figure 2A:
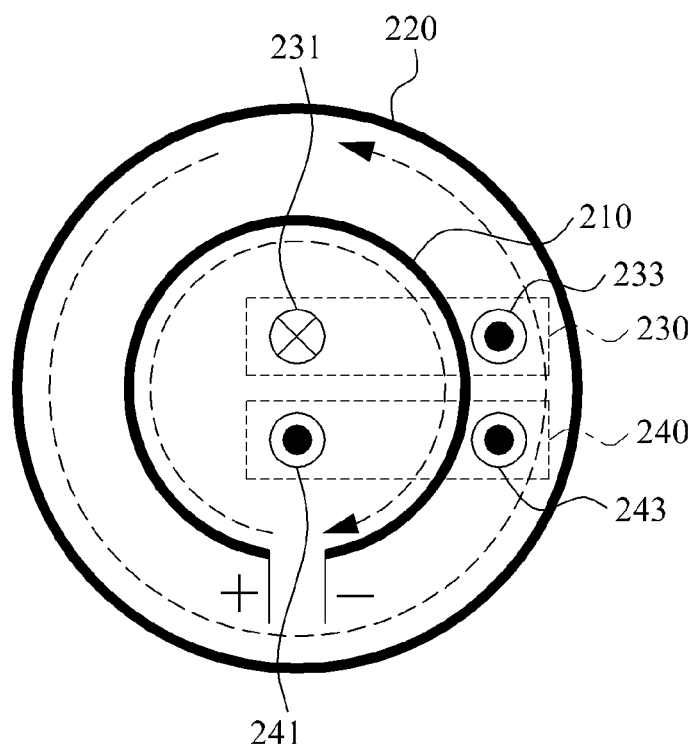
FIGS. 2A through 2B are diagrams illustrating examples of a distribution of a magnetic field in a feeder and a source resonator.
Figure 2B:
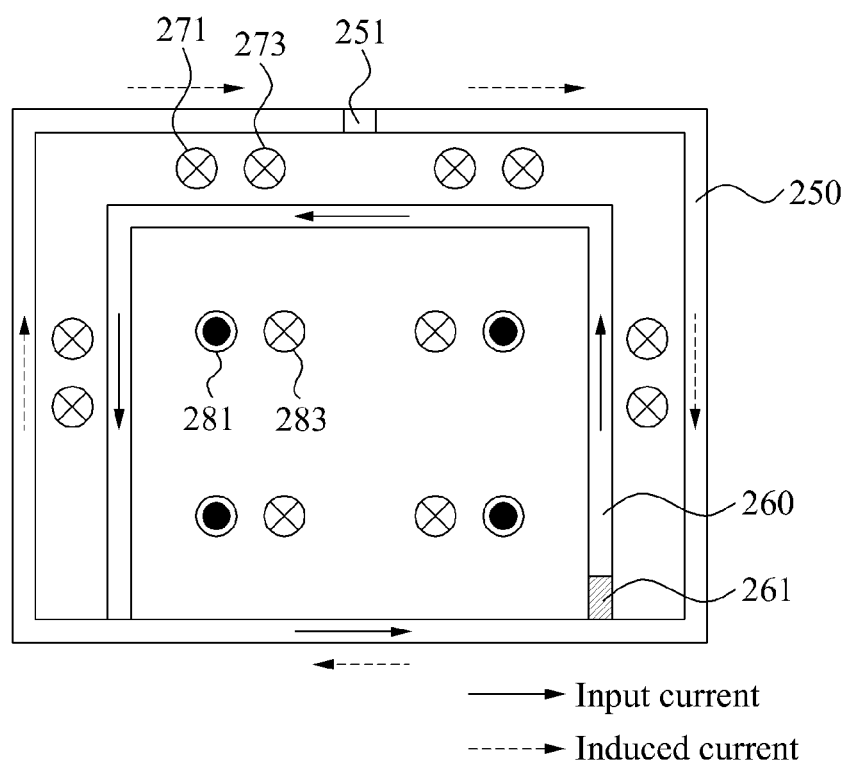

FIGS. 2A and 2B illustrate examples of a distribution of a magnetic field in a feeder and a resonator. If a resonator receives power supplied through a separate feeder, magnetic fields may be formed in both the feeder and the resonator.

Referring to FIG. 2A, as an input current flows into feeder 210, a magnetic field 230 is formed. A direction 231 of the magnetic field 230 within the feeder 210 may have a phase that is opposite to a phase of a direction 233 of the magnetic field 230 outside the feeder 210. The magnetic field 230 formed by the feeder 210 may cause an induced current to be formed in a source resonator 220. In this example, a direction of the induced current may be opposite to a direction of the input current.

As a result of the induced current, a magnetic field 240 may be formed in the source resonator 220. Directions of a magnetic field formed due to an induced current in all positions of the source resonator 220 may be the same. Accordingly, a direction 241 of the magnetic field 240 formed by the source resonator 220 may have the same phase as a direction 243 of the magnetic field 240 formed by the source resonator 220.

Consequently, if the magnetic field 230 formed by the feeder 210 and the magnetic field 240 formed by the source resonator 220 are combined, a strength of the total magnetic field may decrease within the feeder 210, however, the strength may increase outside the feeder 210. In an example in which a power is supplied to the source resonator 220 through the feeder 210 as illustrated in FIG. 2A, the strength of the total magnetic field may decrease in the center of the source resonator 220, but may increase in outer edges of the source resonator 220.

As another example, if a magnetic field is randomly distributed in the source resonator 220, it may be difficult to perform impedance matching because an input impedance may frequently vary. Additionally, if the strength of the total magnetic field is increased, an efficiency of wireless power transmission may be increased. Conversely, if the strength of the total magnetic field is decreased, the efficiency for wireless power transmission may be reduced. Accordingly, a power transmission efficiency may be reduced on average.

In a target resonator, a magnetic field may be distributed as illustrated in FIG. 2A. For example, a current flowing in the source resonator 220 may be induced by the input current flowing in the feeder 210. A current flowing in the target resonator may be induced by a magnetic coupling between the source resonator 220 and the target resonator. The current flowing in the target resonator may cause a magnetic field to be formed such that an induced current may be generated in a feeder located in the target resonator. In this example, a direction of a magnetic field formed by the target resonator within the feeder may have a phase that is opposite to a phase of a direction of a magnetic field formed by the feeder. Accordingly, the strength of the total magnetic field may be reduced.

FIG. 2B illustrates an example of a structure of a wireless power transmitter in which a source resonator 250 and a feeder 260 have a common ground. The source resonator 250 includes a capacitor 251. The feeder 260 may receive an input of a radio frequency (RF) signal via a port 261.

For example, if the RF signal is input to the feeder 260, an input current may be generated in the feeder 260. The input current flowing in the feeder 260 may cause a magnetic field to be formed, and a current may be induced in the source resonator 250 by the magnetic field. Additionally, another magnetic field may be formed due to the induced current flowing in the source resonator 250. In this example, a direction of the input current flowing in the feeder 260 may have a phase that is opposite to a phase of a direction of the induced current flowing in the source resonator 250. Accordingly, in a region between the source resonator 250 and the feeder 260, a direction 271 of the magnetic field formed due to the input current may have the same phase as a direction 273 of the magnetic field formed due to the induced current, and thus the strength of the total magnetic field may increase. Conversely, a direction 281 of the magnetic field formed within the feeder 260 due to the input current may have a phase that is opposite to a phase of a direction 283 of the magnetic field formed due to the induced current, and thus the strength of the total magnetic field may decrease. Therefore, the strength of the total magnetic field may decrease in the center of the source resonator 250, but may increase in outer edges of the source resonator 250.

The feeder 260 may determine an input impedance by adjusting an internal area of the feeder 260. The input impedance refers to an impedance viewed in a direction from the feeder 260 to the source resonator 250. If the internal area of the feeder 260 is increased, the input impedance may be increased. Conversely, if the internal area of the feeder 260 is reduced, the input impedance may be reduced. Because the magnetic field is randomly distributed in the source resonator 250 despite a reduction in the input impedance, a value of the input impedance may vary based on a location of a target device. Accordingly, a separate matching network may be required to match the input impedance to an output impedance of a PA. For example, if the input impedance is increased, a separate matching network may be used to match the increased input impedance to a relatively low output impedance.

As an example, if a target resonator has the same configuration as the source resonator 250, and if a feeder of the target resonator has the same configuration as the feeder 260, a separate matching network may be required because a direction of a current flowing in the target resonator has a phase that is opposite to a phase of a direction of an induced current flowing in the feeder of the target resonator.

Figure 3A:
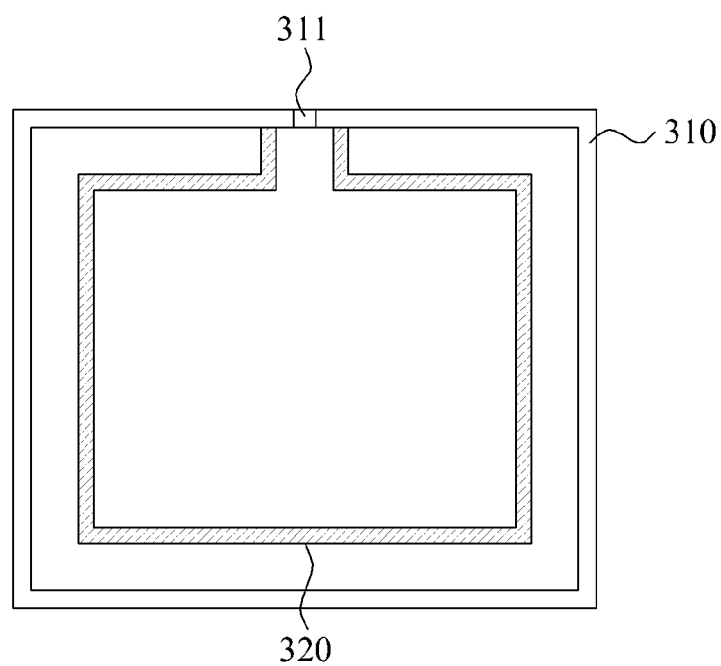
FIGS. 3A and 3B are diagrams illustrating an example of a wireless power transmitter.

FIG. 3A illustrates an example of a wireless power transmitter.

Referring to FIG. 3A, the wireless power transmitter includes a resonator 310 and a feeding unit 320. The resonator 310 may further include a capacitor 311. The feeding unit 320 may be electrically connected to both ends of the capacitor 311.

Figure 3B:
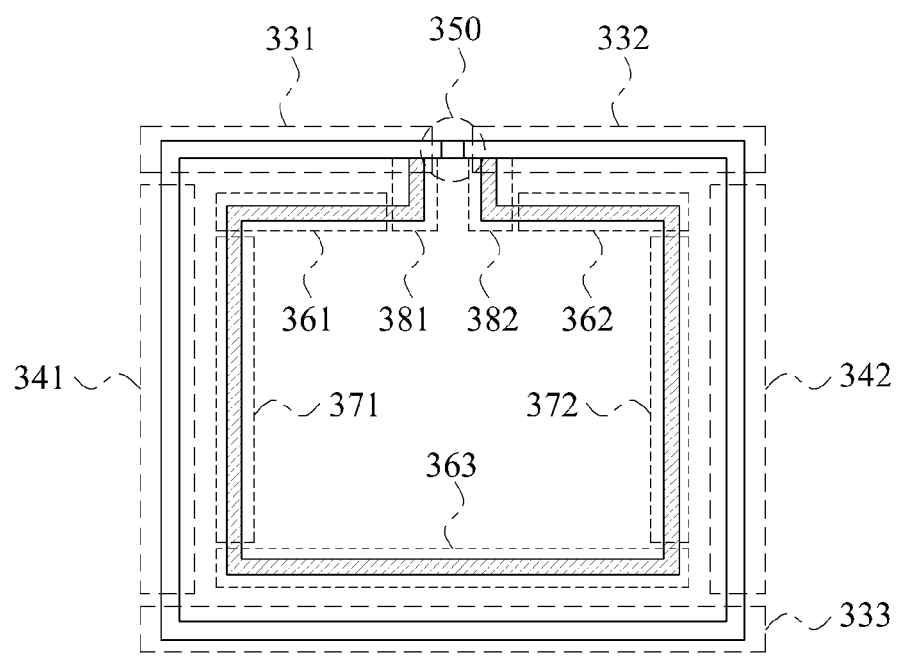

FIG. 3B illustrates another example of the wireless power transmitter of FIG. 3A. In this example, the resonator 310 may include a first transmission line, a first conductor 341, a second conductor 342, and at least one first capacitor 350.

The first capacitor 350 may be inserted in series between a first signal conducting portion 331 and a second signal conducting portion 332 in the first transmission line, and an electric field may be confined within the first capacitor 350. For example, the first transmission line may include at least one conductor in an upper portion of the first transmission line and may include at least one conductor in a lower portion of the first transmission line. Current may flow through the at least one conductor disposed in the upper portion of the first transmission line. The at least one conductor disposed in the lower portion of the first transmission line may be electrically grounded. For example, a conductor disposed in an upper portion of the first transmission line may be separated into and referred to as the first signal conducting portion 331 and the second signal conducting portion 332. A conductor disposed in a lower portion of the first transmission line may be referred to as a first ground conducting portion 333.

FIG. 3B, is a two-dimensional (2D) illustration of the resonator 310. The first transmission line may include the first signal conducting portion 331 and the second signal conducting portion 332 in the upper portion of the first transmission line. In addition, the first transmission line may include the first ground conducting portion 333 in the lower portion of the first transmission line. The first signal conducting portion 331 and the second signal conducting portion 332 may face the first ground conducting portion 333. The current may flow through the first signal conducting portion 331 and the second signal conducting portion 332.

Additionally, one end of the first signal conducting portion 331 may be shorted to the first conductor 341, and another end of the first signal conducting portion 331 may be connected to the first capacitor 350. One end of the second signal conducting portion 332 may be shorted to the second conductor 342, and another end of the second signal conducting portion 332 may be connected to the first capacitor 350. Accordingly, the first signal conducting portion 331, the second signal conducting portion 332, the first ground conducting portion 333, and the conductors 341 and 342 may be connected to each other such that the resonator 310 is configured as an electrically closed-loop structure. The term "loop structure" may include, for example, a polygonal structure such as a circular structure, a rectangular structure, and the like. "Having a loop structure" is used to indicate that the circuit is electrically closed.

The first capacitor 350 may be inserted into an intermediate portion of the first transmission line. For example, the first capacitor 350 may be inserted into a space between the first signal conducting portion 331 and the second signal conducting portion 332. The first capacitor 350 may have a shape of, for example, a lumped element, a distributed element, and the like. For example, a distributed capacitor having the shape of the distributed element may include zigzagged conductor lines and a dielectric material that has a high permittivity between the zigzagged conductor lines.

If the first capacitor 350 is inserted into the first transmission line, the resonator 310 may have a characteristic of a metamaterial. A metamaterial indicates a material that has a predetermined electrical property that has not been discovered in nature, and thus, has an artificially designed structure. An electromagnetic characteristic of the materials existing in nature may have a unique magnetic permeability or a unique permittivity. Most materials have a positive magnetic permeability or a positive permittivity.

In the case of most materials, a right hand rule is applied to an electric field, a magnetic field, and a pointing vector, and thus, the corresponding materials are referred to as right handed materials (RHMs). However, a metamaterial that has a magnetic permeability or a permittivity absent in nature may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

If a capacitance of the first capacitor 350 inserted as the lumped element is determined, the resonator 310 may have the characteristic of the metamaterial. Because the resonator 310 may have a negative magnetic permeability by adjusting the capacitance of the first capacitor 350, the resonator 310 may also be referred to as an MNG resonator. Various criteria may be applied to determine the capacitance of the first capacitor 350. For example, the various criteria may include a criterion for enabling the resonator 310 to have the characteristic of the metamaterial, a criterion for enabling the resonator 310 to have a negative magnetic permeability in a target frequency, a criterion for enabling the resonator 310 to have a zeroth order resonance characteristic in the target frequency, and the like. Based on at least one criterion among the aforementioned criteria, the capacitance of the first capacitor 350 may be determined.

The resonator 310 may have a zeroth order resonance characteristic of having, as a resonant frequency, a frequency when a propagation constant is "0". Because the resonator 310 may have the zeroth order resonance characteristic, the resonant frequency may be independent with respect to a physical size of the MNG resonator 310. By appropriately designing the first capacitor 350, the MNG resonator 310 may sufficiently change the resonant frequency. Accordingly, the physical size of the MNG resonator 310 may not be changed.

In a near field, the electric field may be concentrated on the first capacitor 350 that is inserted into the first transmission line. Accordingly, due to the first capacitor 350, the magnetic field may become dominant in the near field. The MNG resonator 310 may have a relatively high Q-factor using the first capacitor 350 of the lumped element, and thus, it is possible to enhance an efficiency of power transmission. For example, the Q-factor may indicate a level of an ohmic loss or a ratio of a reactance with respect to a resistor in the wireless power transmission. The efficiency of the wireless power transmission may increase according to an increase in the Q-factor.

Although not illustrated in FIG. 3B, a magnetic core may pass through the MNG resonator 310. The magnetic core may increase a power transmission distance.

Referring to FIG. 3B, the feeding unit 320 may include a second transmission line, a third conductor 371, a fourth conductor 372, a fifth conductor 381, and a sixth conductor 382.

The second transmission line may include a third signal conducting portion 361 and a fourth signal conducting portion 362 in an upper portion of the second transmission line. In addition, the second transmission line may include a second ground conducting portion 363 in a lower portion of the second transmission line. The third signal conducting portion 361 and the fourth signal conducting portion 362 may face the second ground conducting portion 363. Current may flow through the third signal conducting portion 361 and the fourth signal conducting portion 362.

Additionally, one end of the third signal conducting portion 361 may be shorted to the third conductor 371, and another end of the third signal conducting portion 361 may be connected to the fifth conductor 381. One end of the fourth signal conducting portion 362 may be shorted to the fourth conductor 372, and another end of the fourth signal conducting portion 362 may be connected to the sixth conductor 382. The fifth conductor 381 may be connected to the first signal conducting portion 331, and the sixth conductor 382 may be connected to the second signal conducting portion 332. The fifth conductor 381 and the sixth conductor 382 may be connected in parallel to both ends of the first capacitor 350. In this example, the fifth conductor 381 and the sixth conductor 382 may be used as input ports to receive an input of an RF signal.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 may be connected to each other such that the resonator 310 and the feeding unit 320 have an electrically closed-loop structure. In response to an RF signal being received via the fifth conductor 381 or the sixth conductor 382, an input current may flow in the feeding unit 320 and the resonator 310, a magnetic field may be formed due to the input current, and a current may be induced to the resonator 310 by the formed magnetic field. A direction of the input current flowing in the feeding unit 320 may be the same as a direction of the induced current flowing in the resonator 310, and thus, a strength of the total magnetic field may increase in the center of the resonator 310, but may decrease in outer edges of the resonator 310.

An input impedance may be determined based on an area of a region between the resonator 310 and the feeding unit 320. Accordingly, a separate matching network used to match the input impedance to an output impedance of a power amplifier may not be required. For example, even if the matching network is used, the input impedance may be determined by adjusting a size of the feeding unit 320, and thus, a structure of the matching network may be simplified. The simplified structure of the matching network may minimize a matching loss of the matching network.

The second transmission line, the third conductor 371, the fourth conductor 372, the fifth conductor 381, and the sixth conductor 382 may form the same structure as the resonator 310. As an example, if the resonator 310 has a loop structure, the feeding unit 320 may also have a loop structure. As another example, if the resonator 310 has a circular structure, the feeding unit 320 may also have a circular structure.

Figure 4A:
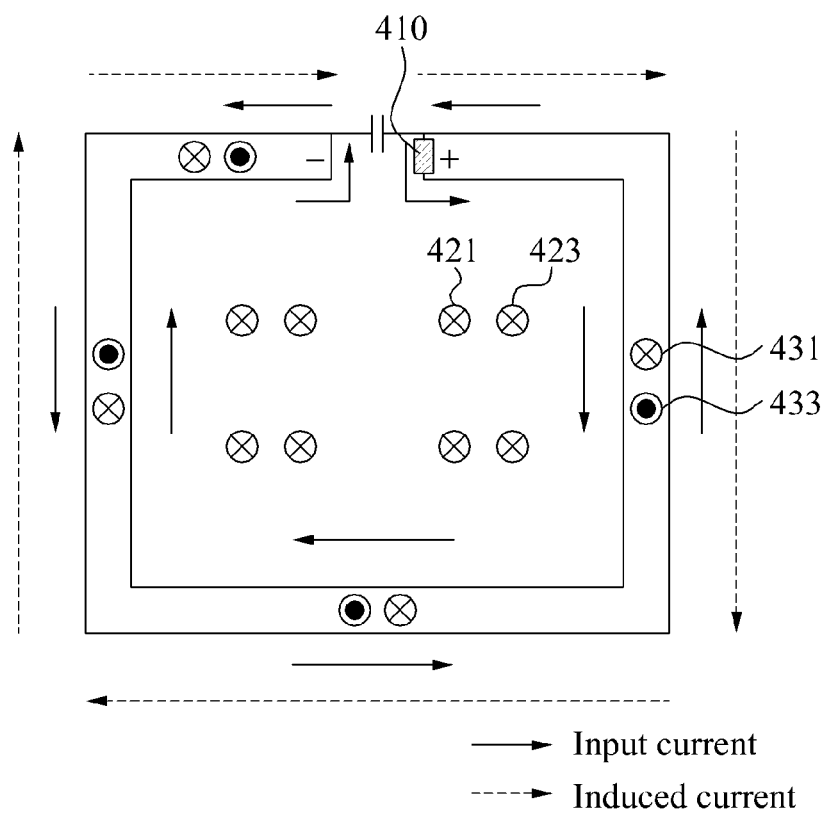
FIG. 4A is a diagram illustrating an example of a distribution of a magnetic field within a source resonator based on feeding of a feeding unit.
Figure 4B:
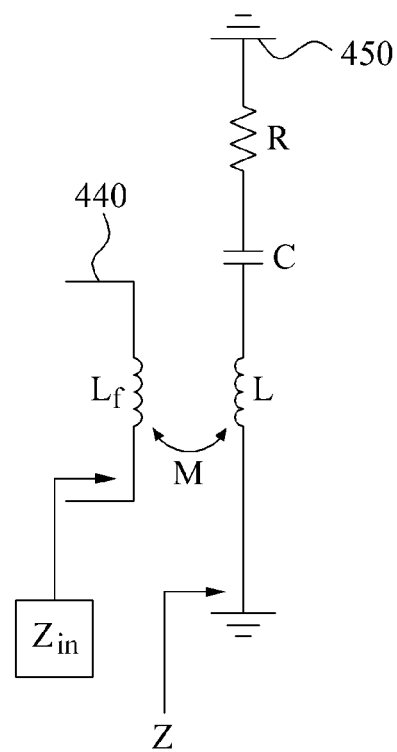
FIG. 4B is a diagram illustrating examples of equivalent circuits of a feeding unit and a source resonator.

FIG. 4A illustrates an example of a distribution of a magnetic field within a resonator based on feeding of a feeding unit. FIG. 4A more briefly illustrates the resonator 310 and the feeding unit 320 of FIG. 3A, and FIG. 4B illustrates an equivalent circuit of a feeding unit 440, and an equivalent circuit of a resonator 450.

A feeding operation in wireless power transmission may refer to supplying power to a source resonator, or may refer to supplying an AC power to a rectification unit. FIG. 4A illustrates a direction of an input current flowing in the feeding unit, and a direction of an induced current induced in the source resonator. Additionally, FIG. 4A illustrates a direction of a magnetic field which is formed due to the input current of the feeding unit, and a direction of a magnetic field which is formed due to the induced current of the source resonator.

Referring to FIG. 4A, a fifth conductor or a sixth conductor of the feeding unit may be used as an input port 410. The input port 410 may receive an RF signal as an input. The RF signal may be output from a PA. The PA may increase or decrease an amplitude of the RF signal based on a demand by a target device. The RF signal received by the input port 410 may be displayed in the form of an input current flowing in the feeding unit. For example, the input current may flow in a clockwise direction in the feeding unit, along a transmission line of the feeding unit. The fifth conductor of the feeding unit may be electrically connected to the resonator. More specifically, the fifth conductor may be connected to a first signal conducting portion of the resonator. Accordingly, the input current may flow in the resonator as well as in the feeding unit. In this example, the input current may flow in a counterclockwise direction in the resonator. The input current flowing in the resonator may cause a magnetic field to be formed such that an induced current may be generated in the resonator due to the magnetic field. The induced current may flow in a clockwise direction in the resonator. For example, the induced current may transfer energy to a capacitor of the resonator, and a magnetic field may be formed due to the induced current. In this example, the input current flowing in the feeding unit and the resonator is indicated by a solid line of FIG. 4A, and the induced current flowing in the resonator is indicated by a dotted line of FIG. 4A.

A direction of a magnetic field formed due to a current may be determined based on the right hand rule. As illustrated in FIG. 4A, a direction 421 of a magnetic field formed within the feeding unit due to the input current flowing in the feeding unit may be identical to a direction 423 of a magnetic field formed due to the induced current flowing in the resonator. Accordingly, a strength of the total magnetic field may increase within the feeding unit.

Additionally, in a region between the feeding unit and the resonator, a direction 433 of a magnetic field formed due to the input current flowing in the feeding unit has a phase that is opposite to a phase of a direction 431 of a magnetic field formed due to the induced current flowing in the resonator, as illustrated in FIG. 4A. Accordingly, a strength of the total magnetic field may decrease in the region between the feeding unit and the resonator.

Typically, a strength of a magnetic field decreases in the center of a resonator with the loop structure, and increases in outer edges of the resonator. However, referring to FIG. 4A, the feeding unit may be electrically connected to both ends of a capacitor of the resonator. Accordingly, the induced current of the resonator may flow in the same direction as the input current of the feeding unit. Because the induced current of the resonator flows in the same direction as the input current of the feeding unit, the strength of the total magnetic field may increase within the feeding unit, and may decrease outside the feeding unit. As a result, the strength of the total magnetic field may increase in the center of the resonator that has the loop structure, and may decrease in the outer edges of the resonator, due to the feeding unit. Thus, the strength of the total magnetic field may be equalized within the resonator.

Additionally, a power transmission efficiency for transferring a power from a source resonator to a target resonator may be in proportion to the strength of the total magnetic field formed in the source resonator. In other words, if the strength of the total magnetic field increases in the center of the source resonator, the power transmission efficiency may also increase.

Referring to FIG. 4B, the feeding unit 440 and the resonator 450 may be expressed as equivalent circuits. An example of an input impedance $Z_{in}$ viewed in a direction from the feeding unit 440 to the resonator 450 may be computed, as given in Equation 4.

$$Z_{in} = \frac{(\omega M)^2}{Z} \quad \text{[Equation 4]}$$

In Equation 4, M denotes a mutual inductance between the feeding unit 440 and the resonator 450, $\omega$ denotes a resonant frequency between the feeding unit 440 and the resonator 450, and Z denotes an impedance viewed in a direction from the resonator 450 to a target device. The input impedance $Z_{in}$ may be in proportion to the mutual inductance M. Accordingly, the input impedance $Z_{in}$ may be controlled by adjusting the mutual inductance M. For example, the mutual inductance M may be adjusted based on the size of an area of a region between the feeding unit 440 and the resonator 450. The area of the region between the feeding unit 440 and the resonator 450 may be adjusted based on a size of the feeding unit 440. In other words, the input impedance $Z_{in}$ may be determined based on the size of the feeding unit 440, and thus, a separate matching network may not be required to perform impedance matching with an output impedance of a PA.

In a target resonator and a feeding unit which are included in a wireless power receiver, a magnetic field may be distributed as illustrated in FIG. 4A. For example, the target resonator may receive a wireless power from a source resonator through magnetic coupling. Due to the received wireless power, an induced current may be generated in the target resonator. A magnetic field formed due to the induced current in the target resonator may cause another induced current to be generated in the feeding unit. In this example, if the target resonator is connected to the feeding unit as illustrated in FIG. 4A, the induced current generated in the target resonator may flow in the same direction as the induced current generated in the feeding unit. Thus, a strength of the total magnetic field may increase within the feeding unit, but may decrease in a region between the feeding unit and the target resonator.

Figure 5:
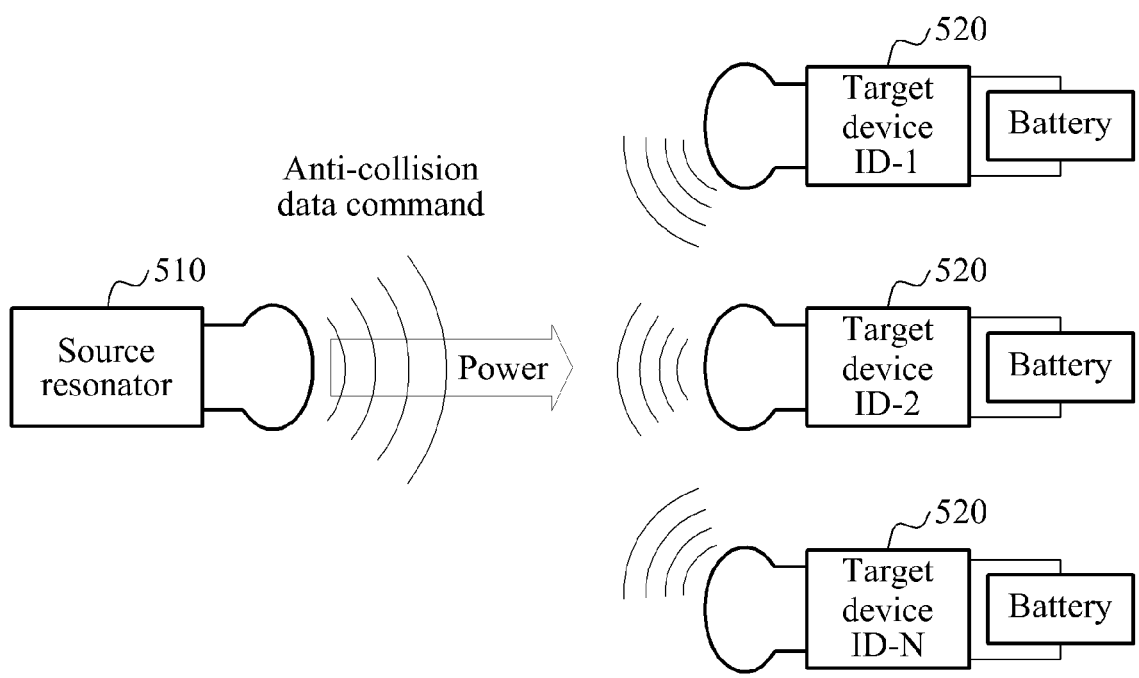
FIG. 5 is a diagram illustrating an example of a multi-target device communication environment.

FIG. 5 illustrates an example of a multi-target device communication environment.

Referring to FIG. 5, a wireless power transmission and charging system 500 includes a single source device 510, and at least one target device 520. In this example, there are N target devices 520.

The source device 510 may transmit power to the at least one target device 520. For example, the source device 510 and the target device 520 may be the source device 110 and the target device 120 of FIG. 1, respectively. The source device 510 may output power, and an anti-collision data command. The at least one target device 520 may respectively include at least one battery.

In an example in which a plurality of target devices 520 simultaneously approach a resonator of the source device 510, or in which the plurality of target devices 520 exist in the resonator of the source device 510, if a power is supplied to the source device 510, data collision may occur due to the plurality of target devices 520. For example, the data collision may occur during an operation for initial connection. Due to the data collision, a normal charging operation may not be performed.

Figure 6:
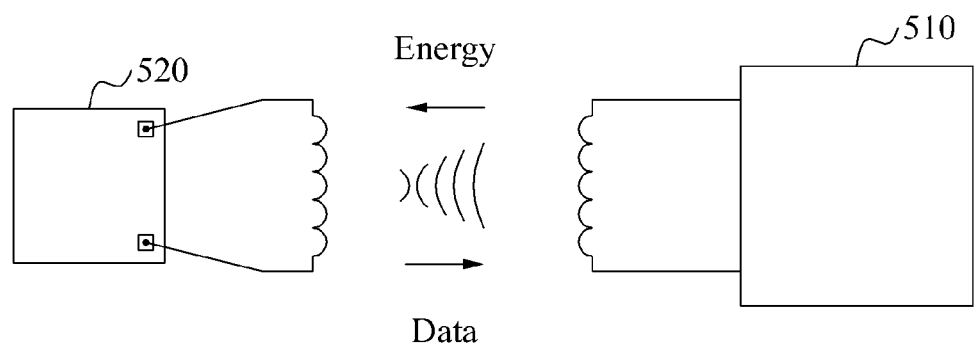
FIG. 6 is a diagram illustrating an example of a mode of a wireless power transmission and charging system of FIG. 5.

FIG. 6 illustrates an example of a mode of the wireless power transmission and charging system 500 of FIG. 5.

The wireless power transmission and charging system 500 may be operated in three modes, in terms of software. The three modes may include, for example, a standby mode, a connection mode, and a transmission and charging control mode.

The standby mode may be a state in which no target device 520 is located within a power transmission distance of the source device 510.

In the connection mode, the source device 510 may verify information on a type and a serial number of the target device 520, and an amount of power used by the target device 520 through an initial connection between the source device 510 and the target devices 520, and control the target device 520 to enter a normal transmission and charging control mode. The initial connection may be performed while the target device 520 exists within the power transmission distance of the source device 510.

In the connection mode, the plurality of target devices 520 may simultaneously send a connection request to the single source device 510. Hereinafter, an example of processing one-to-one communication to be performed between the source device 510 and each of the plurality of target devices 520, in response to the plurality of target devices 520 simultaneously sending a connection request to the source device 510 is further described.

The transmission and charging control mode may refer to a state in which the source device 510 communicates with the target device 520 through a slot that is assigned by the source device 510 to the target device 520 in the connection mode.

In the source device 510, an overall operation of the wireless power transmission and charging system 500 may be classified. In a single target device 520, the standby mode, the connection mode, the transmission and charging control mode, and the standby mode may be sequentially repeated. For example, a single source device 510 and 'N' target devices 520 may perform complex and repetitive operations. For example, when a part of the plurality of target devices 520 are in the charging mode, another part of the target devices 520 may be completely charged already, and a new target device 520 may try to perform connection.

Figure 7:
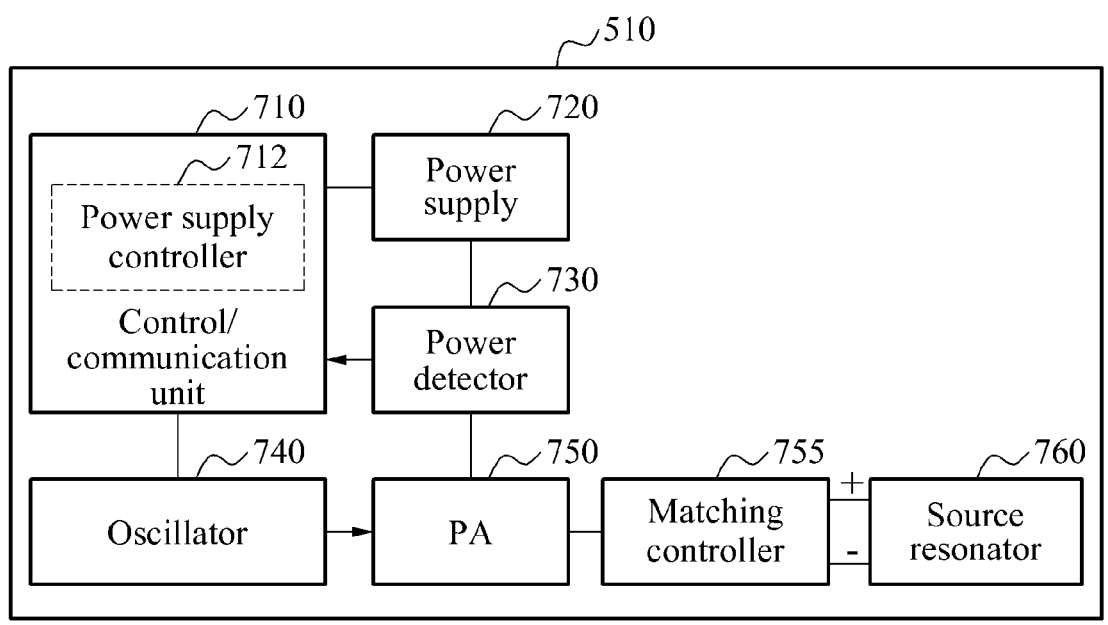
FIG. 7 is a diagram illustrating an example of a source device of FIG. 5.

FIG. 7 illustrates an example of a source device.

Referring to FIG. 7, source device 510 includes a control/communication unit 710, a power supply 720, a power detector 730, an oscillator 740, a PA 750, a matching controller 755, and a source resonator 760 (namely, a transmission (Tx) resonator).

The control/communication unit 710 may be, for example, the control/communication unit 115 of FIG. 1. The power supply 720 may be, for example, the power supply 112 and the AC/DC converter 111 of FIG. 1. Additionally, the power detector 730 may be, for example, the power detector 113 of FIG. 1. The PA 750 may be, for example, the power converter 114 of FIG. 1, and the source resonator 760 may be, for example, the source resonator 116 of FIG. 1.

The control/communication unit 710 may include a power supply controller 712. As another example, the source device 510 may further include the power supply controller 712.

The oscillator 740 may generate a signal with a frequency, for example, in a band of a few KHz to tens of MHz. The generated signal may be the switching pulse signal of FIG. 1. The signal generated by the oscillator 740 may be applied to the PA 750. The oscillator 740 may change the frequency of the signal, and a matching schematic. The control/communication unit 710 may control the oscillator 740 to change the frequency of the generated signal and the matching schematic.

The power supply 720 may be, for example, a switching mode power supply. The power supply controller 712 may control the power supply 720. The power supply controller 712 may control the power supply 720 to apply a supply power to the PA 750. The power applied to the PA 750 by the power supply 720 may be referred to as a "PA supply power." Additionally, the power supply controller 712 may control the power supply 720 to adjust a voltage applied to the PA 750 by the power supply 720. The voltage applied to the PA 750 by the power supply 720 may be referred to as a "PA supply voltage." In response to the power supply 720 adjusting the PA supply voltage, current supplied to the PA 750 may also be adjusted.

The PA 750 may be, for example, a variable switching amplifier. The PA 750 may be designed as a switching amplifier of an E-class. A power output by the PA 750 may be determined based on a frequency of a signal applied from the oscillator 740, and the supply power applied from the power supply 720. The power output by the PA 750 may be referred to as a "PA power". Additionally, a PA current may refer to a current supplied to the PA 750 when the power supply controller 712 controls the power supply 720. A PA voltage may refer to a voltage of the PA power.

The source resonator 760 may transmit, the PA power as electromagnetic energy to the target device 520.

The matching controller 755 may be, for example, a matching circuit. The matching controller 755 may change a matching impedance and a matching frequency. The control/communication unit 710 may control the matching controller 755 to change a matching impedance and a matching frequency. The power detector 730 may detect a current and voltage of the supply power output by the power supply 720, and may transmit information about the detected current and the detected voltage to the control/communication unit 710. For example, the power detector 730 may detect either the PA power, or the PA current and the PA voltage, and may transmit information about either the detected PA power, or the detected PA current and the detected PA voltage, to the control/communication unit 710. Additionally, the power detector 730 may monitor power supplied to the target device 520 by detecting a change in a load and a change in a mode of the target device 520. The power detector 730 may use the detected change in the load and the detected change in the mode to demodulate a modulated load of the target device 520.

Figure 8:
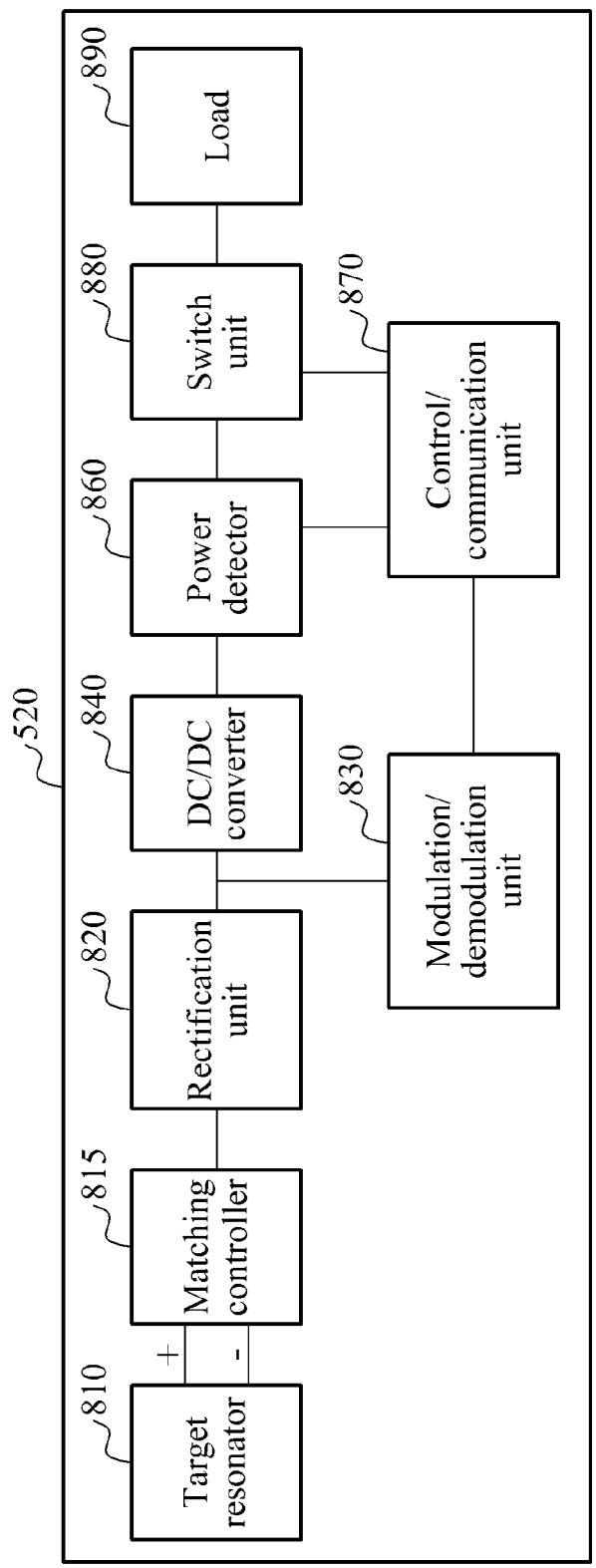
FIG. 8 is a diagram illustrating an example of a target device of FIG. 5.

FIG. 8 illustrates an example of a target device.

As illustrated in FIG. 8, the target device 520 includes a target resonator 810, a matching controller 815, a rectification unit 820, a modulation and demodulation (modulation/demodulation) unit 830, a DC/DC converter 840, a power detector 860, a control/communication unit 870, a switch unit 880, and a load 890.

For example, the target resonator 810, the rectification unit 820, the DC/DC converter 840, the control/communication unit 870, the switch unit 880, and the load 890 may be the target resonator 121, the rectification unit 122, the DC/DC converter 123, the control/communication unit 126, the switch unit 124, and the charging unit 125 of FIG. 1, respectively.

The target resonator 810 may receive an electromagnetic energy from the source resonator 760 of the source device 510. For example, the target resonator 810 may receive a power from the source device 510 through magnetic coupling with the source resonator 760. The received power may be used as a communication power or charging power. Additionally, the target resonator 810 may receive various messages from the source device 510 through in-band communication.

The matching controller 815 may perform impedance matching between the target resonator 810 and the rectification unit 820. The matching controller 815 may be, for example, a matching circuit. The matching controller 815 may change a matching impedance and a matching frequency. The control/communication unit 870 may control the matching controller 815 to change a matching impedance and a matching frequency.

The rectification unit 820 may generate a DC voltage by rectifying an AC voltage that is output from the target resonator 810. In other words, the rectification unit 820 may rectify the AC voltage received via the target resonator 810.

The DC/DC converter 840 may adjust a level of the DC voltage that is output from the rectification unit 820, based on a capacitance of the load 890. As a non-limiting example, the DC/DC converter 840 may adjust the level of the DC voltage output from the rectification unit 820 from 3V to 10V.

The power detector 860 may detect an output power and an output voltage of the DC/DC converter 840. The power detector 860 may transfer the detected output power and the detected output voltage to the control/communication unit 870.

The switch unit 880 may be turned on or off, under the control of the control/communication unit 870. For example, if the target device 520 or the load 890 is completely charged, the switch unit 880 may be turned off. If the switch unit 880 is turned off, the control/communication unit 710 of the source device 510 may detect a power received by the target device 520. In other words, if the switch unit 880 is turned off, a magnetic coupling between the source resonator 760 and the target resonator 810 may be prevented.

As an example, the load 890 may include a battery. The load 890 may include the charging unit 125 of FIG. 1. The load 890 may be charged using a DC voltage output from the DC/DC converter 840.

The control/communication unit 870 may perform in-band communication with the source device 510 using a resonant frequency. To perform the in-band communication, the control/communication unit 870 may use the modulation/demodulation unit 830. For example, the control/communication unit 870 may include the modulation/demodulation unit 830, and a function of the modulation/demodulation unit 830 may be performed by the control/communication unit 870.

The modulation/demodulation unit 830 may detect a signal that is transmitted between the target resonator 810 and the rectification unit 820, or detect an output signal of the rectification unit 820, and may demodulate a signal received by the target device 520. For example, the modulation/demodulation unit 830 may demodulate the signal received by the target device 520 through the in-band communication. Additionally, the modulation/demodulation unit 830 may demodulate a signal to be transmitted to the source device 510, by adjusting an impedance of the target resonator 810, or by turning on or off the switch unit 880.

Figure 9:
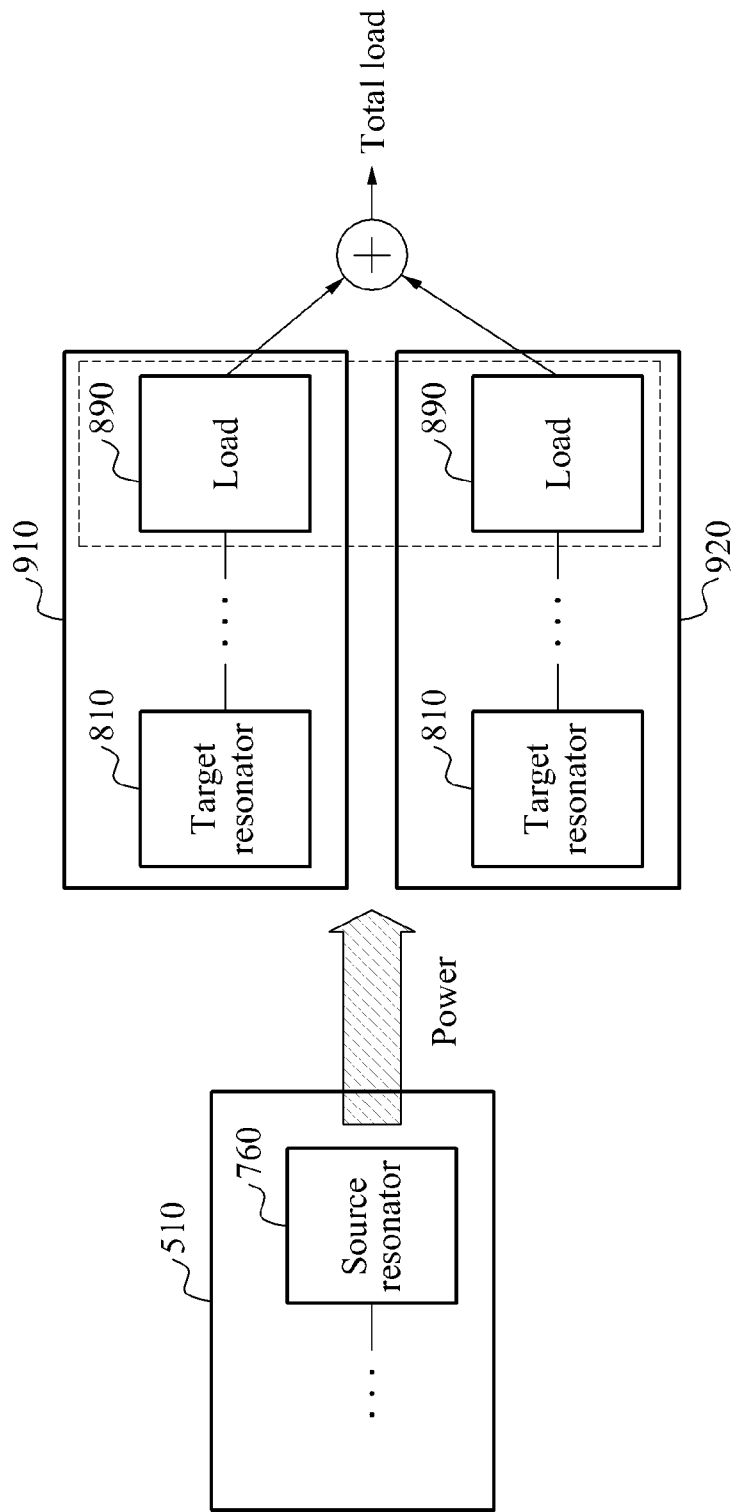
FIG. 9 is a diagram illustrating an example of a change in a target load.

FIG. 9 illustrates an example of a change in a target load.

In FIG. 9, two target devices 910 and 920 are illustrated.

Hereinafter, examples of controlling wirelessly transmitted power are described.

The controlling of the wirelessly transmitted power may include controlling an initial power, controlling a power based on a change in a target load, controlling a power based on a change from a constant current (CC) mode to a constant voltage (CV) mode, and the like.

Controlling of the initial power may refer to controlling and transmitting power when a source device 510 and a target device 520 start connection.

In a wireless power transmission system, the source resonator 760 and the target resonator 810 may differ from each other in efficiency according to manufacturers or products. Accordingly, power may be transmitted by controlling the initial power based on an efficiency difference between the source resonator 760 and target resonator 810, and thus, power may be appropriately transmitted to the target device 520.

Additionally, if a number of currently charged target devices 520 changes or a battery charging mode of the target device 520 changes, the target load may be changed. The battery charging mode may be changed, for example, from the CC mode to the CV mode.

The target load may refer to a load measured in an output end of the PA 750, that is, a load of a target connected to the output end of the PA 750. The target load may be changed, for example, due to a change in number of target devices 520 that are being charged through the source device 510, or a change in the battery charging mode of the target device 520.

For example, if the target load changes, power matched to a load changed by the controlling of the power based on the change in the target load may be transmitted. The controlling of the power based on the change in the target may refer to controlling and transmitting the power based on a changed load.

Hereinafter, five principles used to detect a change in the load 890 in the PA 750 are described. First, current of the PA 750, namely, PA current is detected. Second, a change in a target load is detected based on a change in the detected PA current. Third, if the PA current is increased during charging, it is determined that a load is added.

In a charging state, the source device 510 may recognize the target device 520 and may supply a required power to the target device 520. The control/communication unit 710, or the power supply controller 712 may control the power supply 720 to provide the PA 750 with a controlled PA supply power. The control/communication unit 710 may verify the current and the charging state via communication. The power detector 730 may detect the change in the PA current. For example, if the PA current increases above a reference current value, the control/communication unit 710 may determine that the load 890 is added. The control/communication unit 710 may recognize the added load 890, and may control the PA power.

Fourth, if the PA current is reduced during charging, it is determined that a load is reduced. In an example in which the source device 510 is in the charging state, if the PA current detected by the power detector 730 reduces below a current value detected during charging, the control/communication unit 710 may determine that the target load is changed, may verify a state of the target device 520, and may control the PA supply power.

Fifth, if charging is started or is already performed, and if the PA current is equal to or less than a reference current, it is determined that there is no target device 520.

When there is no target device 520, only the source resonator 760 may be regarded as a load of the PA 750. For example, the control/communication unit 710 may determine whether the target device 520 exists according to an output of the PA 750 (for example, the PA current), based on a PA current when there is no load.

Hereinafter, conditions used when the source device 510 controls power and detects a load are described.

To supply power to the target device 520 based on a change in the load 890, the PA 750 may output a power that matches the target load. To output the power matched to the target load, the following two conditions may be satisfied.

First, an impedance matching condition should be satisfied. An impedance in a source side should satisfy a matching condition for a load impedance. The impedance in the source side may include, for example, an impedance of the source device 510 including the source resonator 760, and an impedance of the target resonator 810.

A value of a reflection coefficient may be used to determine whether the matching condition is satisfied. The reflection coefficient may be computed by Equation 5.

$$\Gamma = \frac{V_r}{V_i} = \frac{Z_L - Z_O}{Z_L + Z_O} \quad \text{[Equation 5]}$$

In Equation 5, Γ denotes a reflection coefficient. $V_i$ denotes an incident wave, and $V_r$ denotes a reflected wave, $Z_o$ denotes a source impedance, and $Z_L$ denotes a load impedance.

Second, a resonant frequency condition between the source device 510 and the target device 520 should be satisfied. The source device 510 and the target device 520 should have the same resonant frequency.

Hereinafter, a principle of detecting a target load is described.

The control/communication unit 710 may detect a change in the load 890 of the target device 520, by detecting the PA supply power supplied by the power supply 720. If the impedance of the source resonator 760 is matched with the impedance of the target resonator 810, the load 890 measured in the output end of the PA 750 may be represented as a sum of at least one load 890 of at least one target device 520. For example, referring to FIG. 9, if a load 890 of a target device 910 corresponds to 3 W and a load 890 of a target device 920 corresponds to 3 W, a total load measured in the output end of the PA 750 of the source device 510 is 6 W.

The power output by the PA 750, namely the PA power, may be determined based on a change in an output load, as given in Equation 6.

$$\text{Pwr} = (V_{rms})^2 / R \quad \text{[Equation 6]}$$

In Equation 6, Pwr denotes an output power, and R denotes an output load, namely, a target load.

If the output load R decreases, the output power Pwr may increase. On the other hand, if the output load R increases, the output power Pwr may decrease. Based on such a theory, a change in a load may be detected in wirelessly charging. Detecting a change in the target load based on the change in the PA current may be used to control the PA power and to determine whether to communicate with the target device 520.

Figure 10:
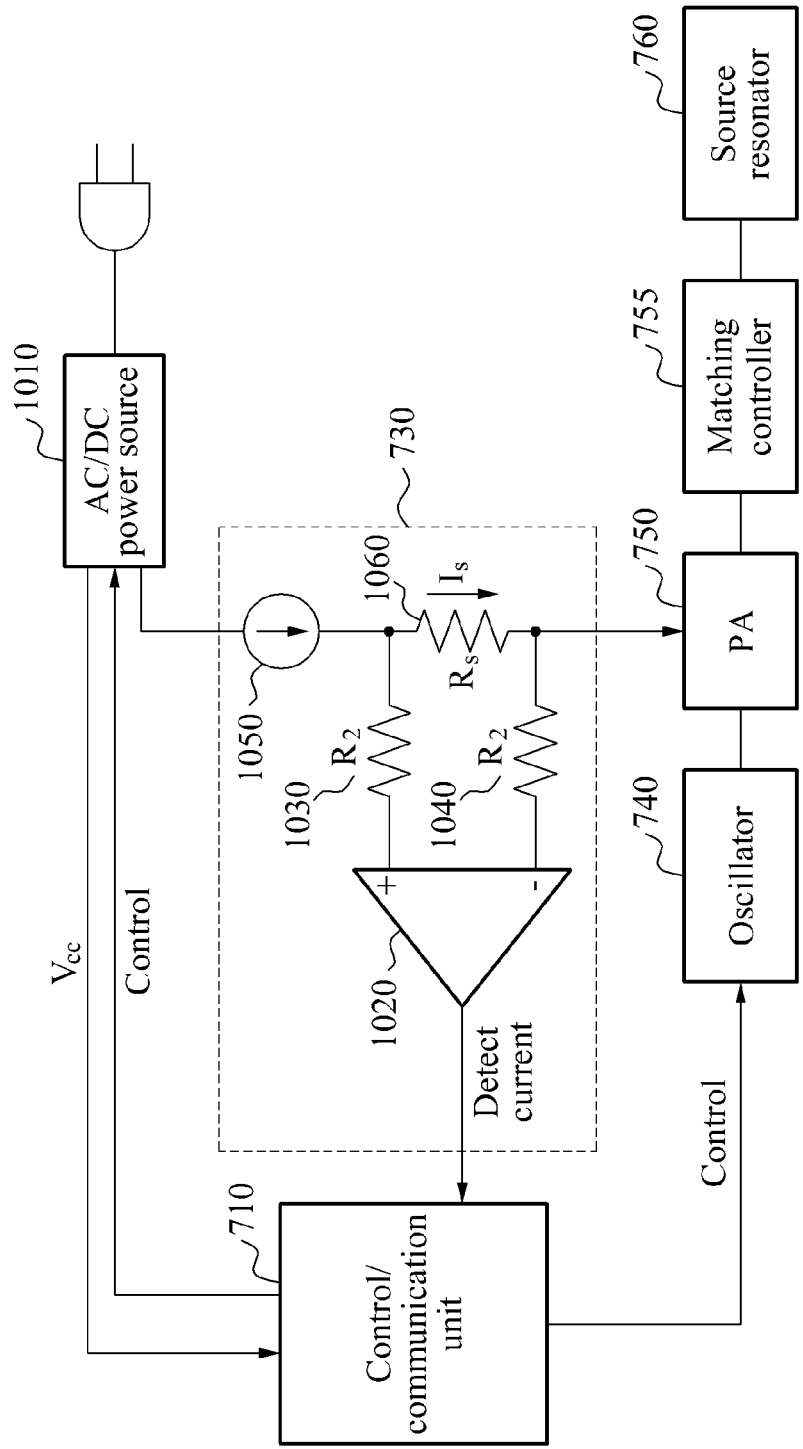
FIG. 10 is a diagram illustrating an example of a power detector in the source device.

FIG. 10 illustrates an example of a power detector in a source device.

An operation by which the power detector 730 detects the PA current is further described with reference to FIG. 10.

The power detector 730 may detect PA current, and may transmit the detected PA current to the control/communication unit 710.

The AC/DC power source 1010 may function as the power supply 720.

The control/communication unit 710 may receive power $V_{cc}$ that may be used for an operation of the control/communication unit 710. The control/communication unit 710 may control the AC/DC power source 1010 to adjust a PA supply power that is output by the AC/DC power source 1010 to the power supply 720. The control/communication unit 710 may control the oscillator 740 to change a frequency of a signal generated by the oscillator 740, and a matching schematic.

The power detector 730 may include a comparator 1020 and a first resistor 1060. The power detector 730 may further include a second resistor 1030, a third resistor 1040, and a current detector 1050.

In this example, a first terminal of the first resistor 1060, an output of the AC/DC power source 1010, and a positive terminal of the comparator 1020 are connected to each other. Additionally, a second terminal of the first resistor 1060, an input of the PA 750, and a negative terminal of the comparator 1020 are connected to each other.

The PA current may flow to the first resistor 1060.

The comparator 1020 may control voltages applied to both the positive terminal and the negative terminal, and may output the voltages to the control/communication unit 710. For example, the voltages applied to both the positive terminal and the negative terminal of the comparator 1020 may be equal to voltages applied to both the first terminal and the second terminal of the first resistor 1060. The control/communication unit 710 may verify a first resistance. Accordingly, the control/communication unit 710 may compute a current $I_s$, namely the PA current, flowing in the first resistor 1060 based on a resistance value of the first resistor 1060 and the voltages applied to both the positive terminal and the negative terminal of the comparator 1020. Additionally, the control/communication unit 710 may detect a target load based on the computed PA current.

In this example, the second resistor 1030 connects the first terminal of the first resistor 1060 and the positive terminal of the comparator 1020. The third resistor 1040 connects the second terminal of the first resistor 1060 and the negative terminal of the comparator 1020. The second resistor 1030 and the third resistor 1040 may adjust the voltages applied to both the positive terminal and the negative terminal of the comparator 1020.

Figure 11:
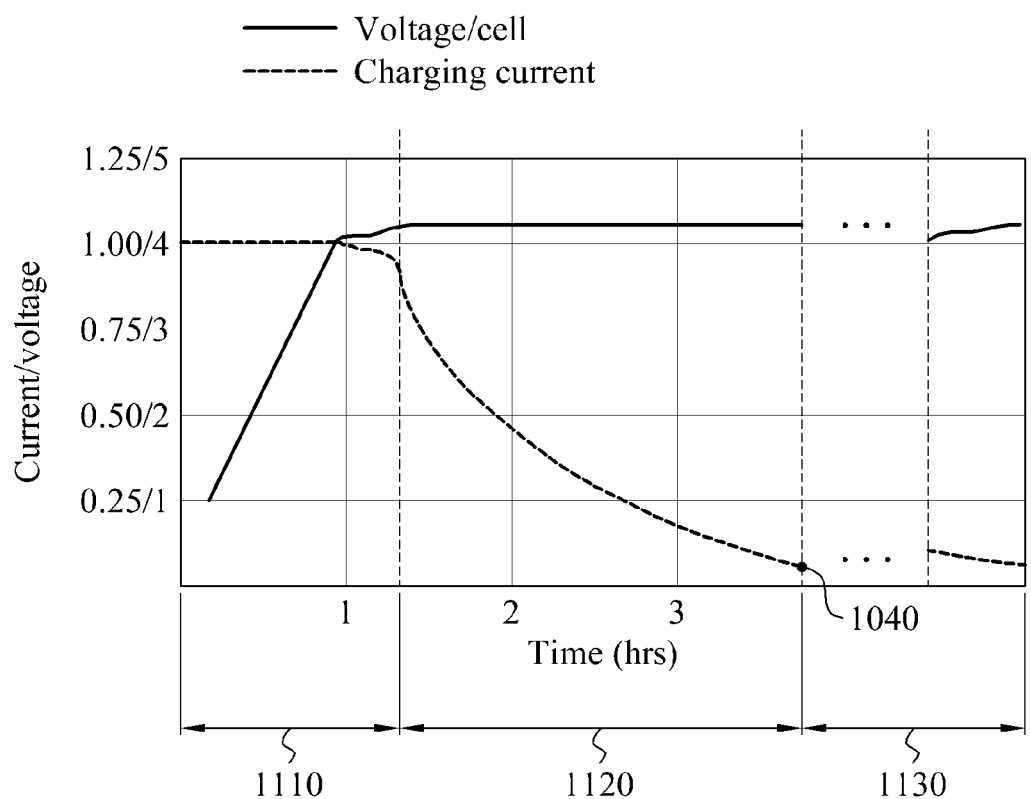
FIG. 11 is a diagram illustrating an example of a change in a battery load.

FIG. 11 illustrates an example of a change in a battery load.

In graph 1100 of FIG. 11, an x-axis represents time and a y-axis represents current and/or voltage. Furthermore, a solid line indicates voltage and/or cell, and a dotted line indicates a charging current.

Prior to charging, the control/communication unit 870 may verify a voltage or a temperature of a battery, for example, the load 890.

The battery may be charged through one or more of three operations. In operation 1110, the battery may be charged with a CC. For example, in operation 1110, a maximum charging current may be applied to the battery, until a charging voltage cell voltage limit is reached. In operation 1110, a charging current of about 0.5 C to 0.7 C with respect to a battery capacitance may be applied. In this example, C denotes a capacitance of the battery. As an example, if a battery has a capacitance of 1000 mA, a charging current of about 500 mA to 700 mA may be applied to the battery, to charge the battery. The charging voltage may be gradually increased to, for example, a range of 4.15 V to 4.2 V.

Operation 1110 may be divided into a preliminary charging operation and a quick charging operation. As an example, in the preliminary charging operation, a charging voltage equal to or less than 3 V may be applied. As another example, in the quick charging operation, a charging voltage equal to or greater than 3 V may be applied.

In operation 1120, the battery may be charged with a CV. A charging voltage reaches a maximum cell voltage, as a charging state of the battery comes close to a fully charged state, and the charging current may start to drop. In operation 1120, a CV ranging from, for example, 4.15 V to 4.2 V may be maintained as a charging voltage.

The charging voltage may be, computed based on Equation 7.

$$\text{Charging voltage} = \text{Battery voltage} + \text{Charging current} \times \text{Resistance} \quad [\text{Equation 7}]$$

In Equation 7, the resistance corresponds to a sum of a battery internal resistance and a circuit resistance. As illustrated in Equation 7, as the resistance increases, a voltage charging time is lengthened.

Referring to FIG. 11, at a point 1040 at which the charging current drops below 3% of rated current, operation 1120 may be terminated. In response to the charging current becoming lower than a reference value, for example 3% of rated current, due to an increase in a charge amount in a battery, the control/communication unit 870 may detect a reduced PA current using the power detector 730, and may terminate the charging.

In operation 1130, topping charging may be performed. For example, the topping charge may be applied to the battery intermittently, such as one time per 500 hours.

Figure 12:
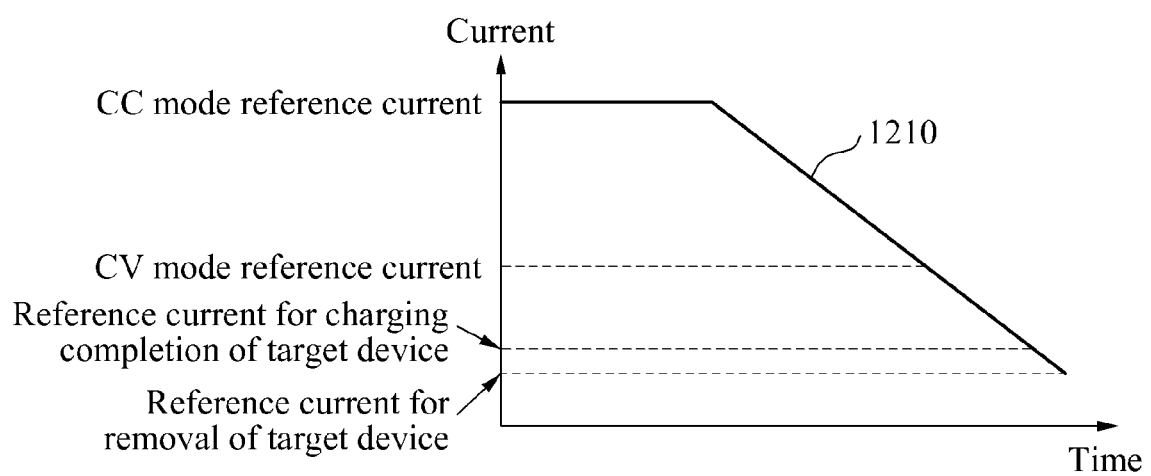
FIG. 12 is a diagram illustrating an example of a change in charging current.

FIG. 12 illustrates an example of a change in charging current.

In graph 1200 of FIG. 12, an x-axis represents time and a y-axis represents a value of charging current. FIG. 12 illustrates an example of a value of charging current 1210 over time.

The load 890 may be charged in the CC mode for a predetermined period of time, for example, 50 minutes. Here, the charging current may be referred to as a "CC mode reference current." In other words, the CC mode reference current may indicate the value of the charging current 1210 when the load 890 is charged in the CC mode. A charging voltage may be gradually increased to about 4.2 V.

Subsequently, the charging current 1210 may be gradually reduced to a range of 20 mA to 30 mA. If a charging mode of the target device 520 changes, the charging current 1210 may have a predetermined value. A point in time at which the charging current 1210 is reduced to the range of 20 mA to 30 mA may be determined as a charging termination point. The charging current 1210 may be reduced for a predetermined period of time, for example 3 hours, and the load 890 may be charged with current of 0.5 C to 1.0 C.

A CV mode reference current indicates a value of the charging current 1210 when a charging mode of the load 890 changes from the CC mode to the CV mode. A reference current for charging completion of a target device may indicate a value of the charging current 1210 when charging of the target device 520 is completed. Additionally, a reference current for removal of a target device may indicate a value of the charging current 1210 when the target device 520 is to be removed.

Figure 13:
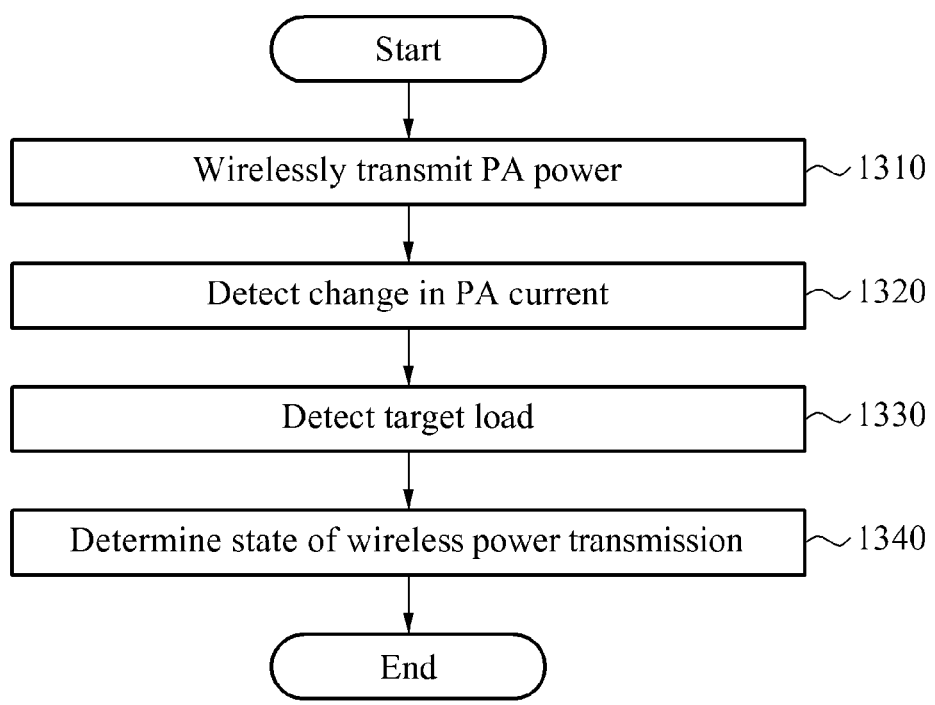
FIG. 13 is a flowchart illustrating an example of a method of detecting a load for wireless power transmission and of determining a state of wireless power transmission.

FIG. 13 illustrates a method of detecting a load for wireless power transmission and of determining a state of wireless power transmission.

Referring to FIG. 13, in operation 1310, the control/communication unit 710 determines a PA power. For example, the control/communication unit 710 may control the power supply 720 to adjust the PA supply voltage. The power supply 720 may apply the PA supply voltage to the PA 750, based on the control of the control/communication unit 710. The PA 750 may output the determined PA power. The source resonator 760 may wirelessly transmit the PA power to the target device 520.

As an example, a plurality of target devices 520 may be provided. In this example, a target load may correspond to a sum of loads 890 of each of the plurality of target devices 520.

In operation 1320, the control/communication unit 710 detects a change in the PA current. For example, the power detector 730 may detect a current of the PA power, namely, the PA current. The control/communication unit 710 may detect the change in the PA current, using the power detector 730. For example, if the charging mode of the target device 520 changes from the CC charging mode to the CV charging mode, the PA current may change.

In operation 1330, the control/communication unit 710 detects a target load based on the change in the PA current.

In operation 1340, the control/communication unit 710 may determine the state of wireless power transmission, based on the detected target load. For example, if the detected current becomes lower than a predetermined value, the control/communication unit 710 may terminate charging of the target device 520. Additionally, the control/communication unit 710 may adjust the PA power based on the detected target load.

Table 1 shows an example of a relationship between the change in the PA current detected in operation 1320, and the state of the wireless power transmission determined in operation 1340.

detect the change in the PA current, using the power detector 730. The control/communication unit 710 may detect a target load based on the change in the PA current.

The control/communication unit 710 may determine the state of the wireless power transmission, based on the change in the PA current, or based on the detected target load.

In operation 1430, the control/communication unit 710 requests the target device 520 to transmit a state of the target device 520 (hereinafter, referred to as a target device state).

In operation 1440, the control/communication unit 710 receives the target device state from the target device 520. For example, if the target device state is not received after a predetermined period of time elapses, the control/communication unit 710 may determine that there is no response from the target device 520.

In operation 1450, the control/communication unit 710 verifies the received target device state.

In operation 1460, the control/communication unit 710 determines the state of wireless power transmission, based on the detected change in the PA current, or the detected target load, and based on the target device state. The control/communication unit 710 may control the source device 510, for

TABLE 1

| Change in PA current | State of wireless power transmission |
| --- | --- |
| PA current changes within a predetermined period of time. | A location of a target device may be changed, or a location of a charging pad may be changed, or external effects may occur. |
| PA current is generated for more than a predetermined period of time. | Charging of a target device may fail, or other problems may occur. |
| A source device is in a single target device charging mode, or in the CC mode, and the PA current is reduced. | A currently charged target device may be removed, or a target device may be changed from the CC mode to the CV mode. |
| A source device is in a multi-target device charging mode, and the PA current is reduced to a predetermined level. | A currently charged target device may be changed from the CC mode to the CV mode, or charging of the target device may be completed. |
| A source device is in the multi-target device charging mode, and the PA current is reduced to a current corresponding to a target load occurring when there is no target device. | Whether a target device exists may be determined via communication between a source device and a target device. |
| A source device is in the single target device charging mode, or in the multi-target device charging mode, and the PA current is increased. | A target device may be added. |
| Abnormally high PA current (namely, an overcurrent) is detected. | An operation for protecting a source device may be performed. |

Figure 14:
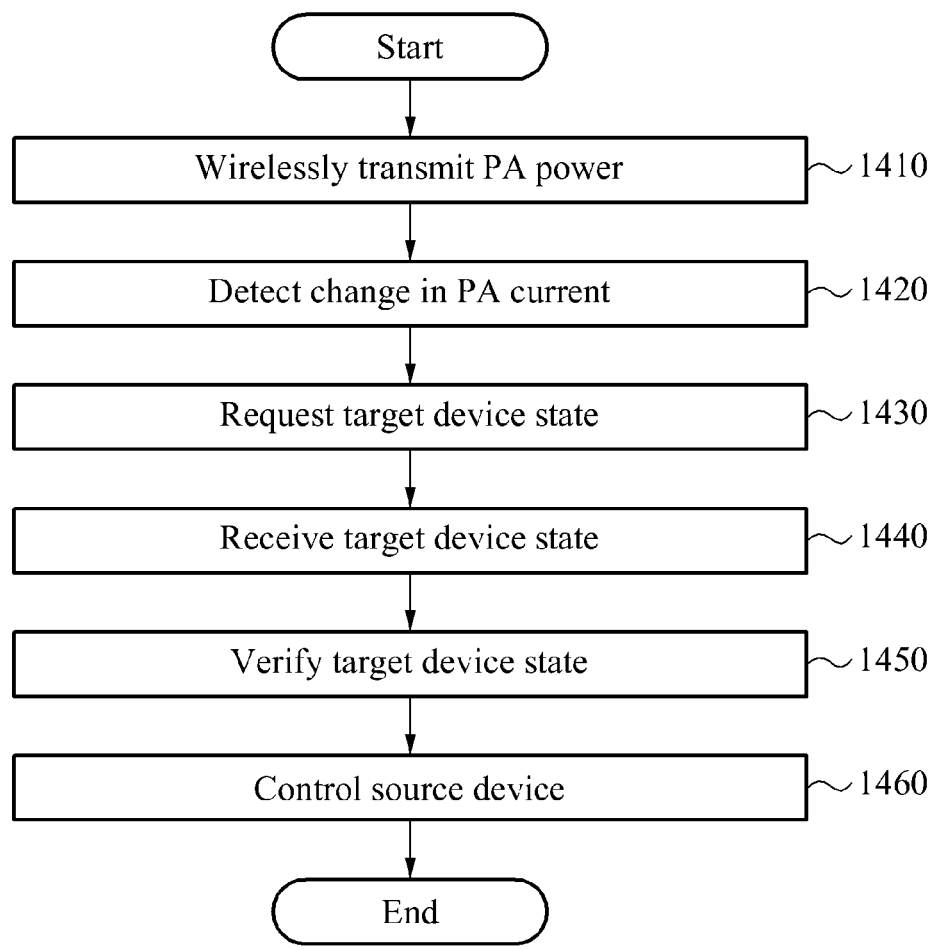
FIG. 14 is a flowchart illustrating an example of a method of controlling wireless power transmission.

FIG. 14 illustrates an example of a method of controlling wireless power transmission.

Referring to FIG. 14, in operation 1410, the control/communication unit 710 may determine a PA power. For example, control/communication unit 710 may control the power supply 720 to adjust the PA supply voltage. The power supply 720 may apply the PA supply voltage to the PA 750, based on the control of the control/communication unit 710. The PA 750 may output the determined PA power. Accordingly, in 1410 the source resonator 760 wirelessly transmits the PA power to the target device 520. For example, a plurality of target devices 520 may be provided. In this example, a target load may correspond to a sum of loads 890 of each of the plurality of target devices 520.

In operation 1420, the control/communication unit 710 detects a change in the PA current. For example, the power detector 730 may detect a current of the PA power, namely, the PA current. The control/communication unit 710 may example, an operation for the wireless power transmission performed by the source device 510, based on the determined state of the wireless power transmission.

Hereinafter, examples of determining a state of wireless power transmission and of controlling the source device 510 are described with reference to FIGS. 15 through 26 and also in view of FIG. 14.

Figure 15:
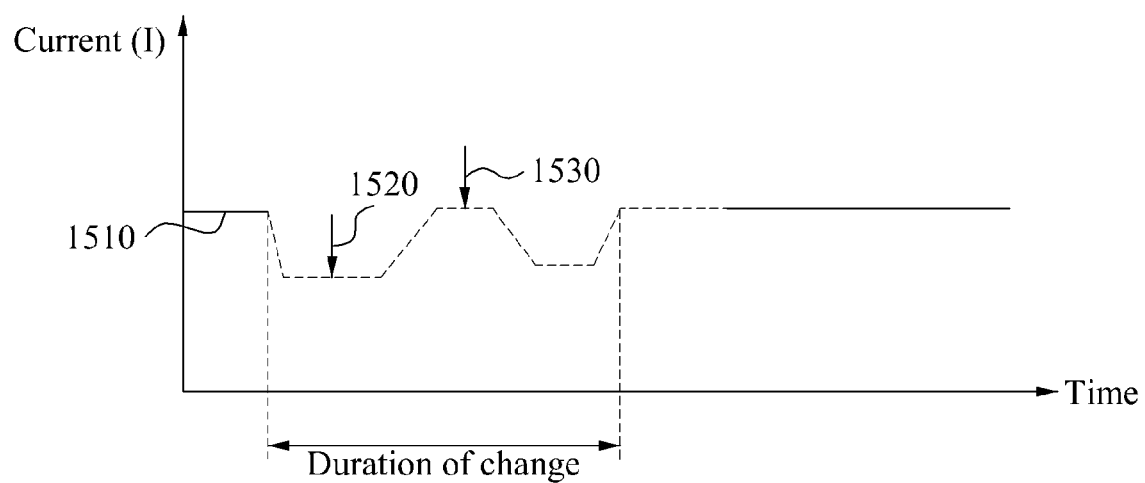
FIG. 15 is a diagram illustrating an example in which a change in current is detected within a predetermined period of time.

FIG. 15 illustrates an example in which a change in current is detected within a predetermined period of time.

In graph 1500 of FIG. 15, an x-axis represents time and a y-axis represents current. The graph 1500 shows a level 1510 of detected PA current, and points 1520 and 1530 at which a change in PA current within a predetermined period of time is detected.

For example, if a location of the target device 520 changes during charging, if a location of a charging pad used for charging by the source device 510 changes, if a distance between the source device 510 and the target device 520 changes during charging, or if other external effects occur, the PA current may be changed. Accordingly, in an example in which the PA current is changed within a predetermined period of time, or within a predetermined range of current, the control/communication unit 710 may determine that the PA current remains unchanged in operation 1420. In another example in which the PA current changes within a predetermined period of time, and within a predetermined range, the control/communication unit 710 may determine that the PA current remains unchanged in operation 1420.

As another example in which the PA current is returned to a reference value within a predetermined period of time, the control/communication unit 710 may determine that the PA current remains unchanged, and may maintain the PA power without any change in operation 1420.

Figure 16:
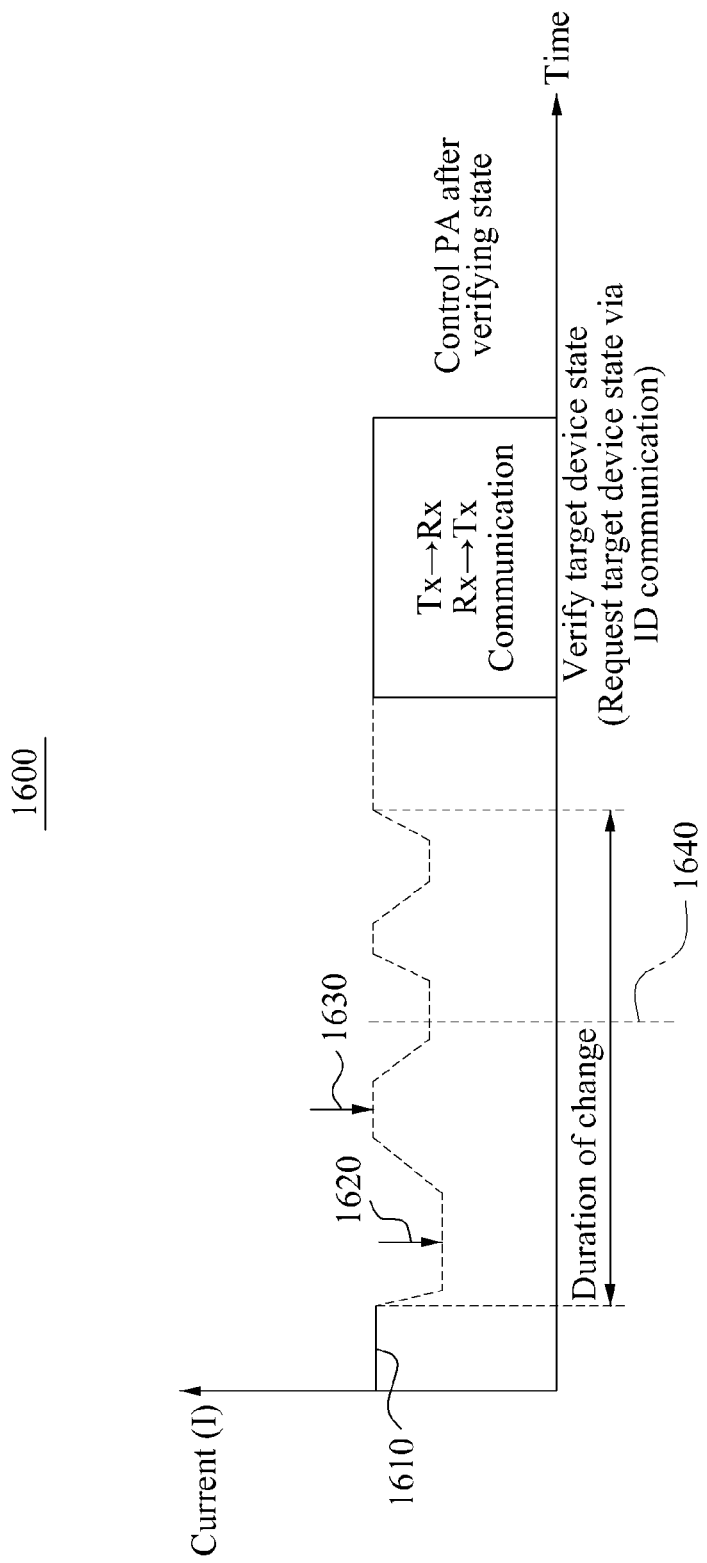
FIG. 16 is a diagram illustrating an example in which a change in current is detected for more than a predetermined period of time.

FIG. 16 illustrates an example in which a change in current is detected for more than a predetermined period of time.

In graph 1600 of FIG. 16, an x-axis represents time and a y-axis represents current. The graph 1600 shows a level 1610 of detected PA current, and points 1620 and 1630 in which a change in PA current within a predetermined level is detected. Additionally, the graph 1600 shows a communication between the source device 510 and the target devices 520. In FIGS. 16, 18, 20, 21, and 23 through 26, Tx, and Rx are used to indicate the source device 510 and the target device 520, respectively.

For example, if a location of the target device 520 changes during charging, if a location of a charging pad used for charging by the source device 510 changes, if a distance between the source device 510 and the target device 520 changes during charging, or if other external effects occur, the PA current may be changed.

When current continues to be changed for more than a predetermined period of time (for example, for a period of time beyond a reference point 1640), the control/communication unit 710 may request the target device state from the target device via an ID communication, and the like, in operation 1430.

In operation 1460, based on the received target device state, the control/communication unit 710 may adjust power transmission. For example, the control/communication unit 710 may reset the target device 520 and recharge the target device 520, may control the PA 750 (for example, turn off the PA 750), may create a notification of occurrence of an error, may create a notification to request verification of the charging state of the target device 520, and the like. Additionally, the control/communication unit 710 may control the operation for the wireless power transmission by adjusting the PA power based on the received target device state.

FIG. 17 illustrates an example in which a load is removed during charging of a single target device.

Referring to FIG. 17, in a state 1700, the target device 520 is being charged by the source device 510. The source device 510 may be in a single terminal charging mode, or in the CC mode. In the single terminal charging mode, a single target device may be charged.

In a state 1750, the target device 520 being charged is removed. In response to the target device 520 being removed, a target load may reflect only a load of the source resonator 760. Accordingly, PA current corresponding to the load of the source resonator 760 may be output from the PA 750.

Figure 18:
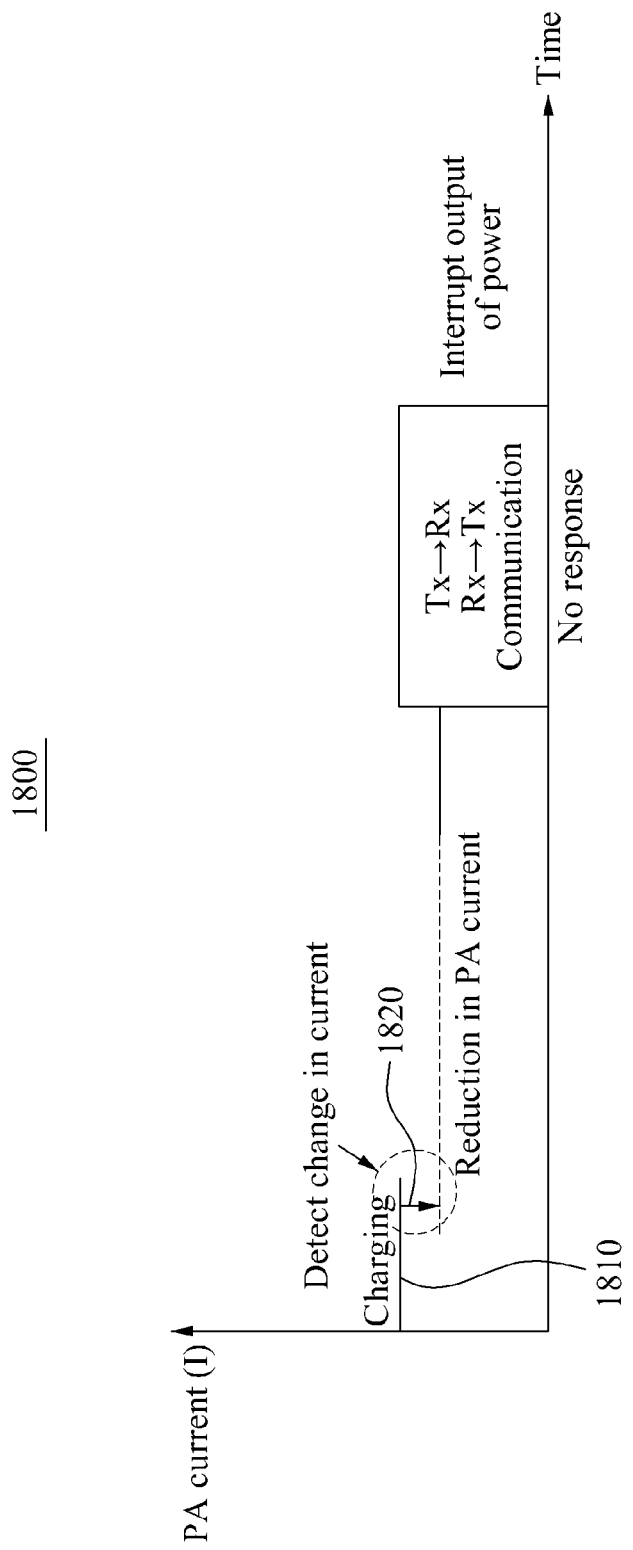
FIG. 18 is a diagram illustrating an example in which a single target device is removed during charging of the single target device.

FIG. 18 illustrates an example in which a single target device is removed during charging of the single target device.

In graph 1800 of FIG. 18, an x-axis represents time and a y-axis represents PA current. The graph 1800 shows a level 1810 of detected PA current, and a point 1820 at which a change in PA current within a predetermined level is detected. At the point 1820, the PA current is reduced during charging of the target device 520. Additionally, the graph 1800 shows a communication between the source device 510 and the target device 520.

The reduced PA current may correspond to a target load being reduced by the removal of the target device 520. For example, the reduced PA current may indicate a reference current based on the removal of a target device. In operation 1420, the control/communication unit 710 may detect that the PA current is at an amount corresponding to the removal of the target device 520.

Because the target device 520 is removed, a request for the target device state may not be transferred to the target device 520, for example, in operation 1430 of FIG. 14. That is, the source device 510 may transmit a request for the target device to transmit an acknowledge (ACK) in response to the request, but a response to the request may not be received from the target device 520. Additionally, in operation 1440, the target device 520 may not transmit the target device state because the target device 520 has been removed.

In operation 1460, the control/communication unit 710 may interrupt an output of the PA power. For example, if the PA current is changed by removal of the target device 520 in operation 1430, and if the target device state is not received from the target device 520 in operation 1440, the control/communication unit 710 may interrupt the output of the PA power, to control the operation for the wireless power transmission.

The above description with reference to FIGS. 17 and 18 may also be applied to an example in which charging of the target device 520 is completed. For example, if the charging of the target device 520 is completed, there may be no need to charge the target device 520, and the source device 510 may regard that the target device 520 as having completed charging. In this example, the target device 520 may transmit, to the control/communication unit 710, a notification of completion of the charging of the target device 520, in operation 1440. In operation 1460, the control/communication unit 710 may interrupt the output of the PA power.

FIG. 19 illustrates an example of a change in a mode of a target device that is being charged.

Referring to FIG. 19, in a state 1900, a single target device 520 is being charged in the CC mode. Additionally, the target device 520 may have a load 890 of 3 W in the CC mode. If the target device 520 is charged, the charging mode of the target device 520 may be changed from the CC mode to the CV mode. Accordingly, the charged load 890 may be increased.

In a state 1950, the target device 520 is being charged in the CV mode. Additionally, the target device 520 may have a load 890 of 1 W in the CV mode. In other words, if the charging mode of the target device 520 is changed from the CC mode to the CV mode, a target load may be increased. Due to an increase in the target load, PA current output from the PA 750 may be reduced.

Figure 20:
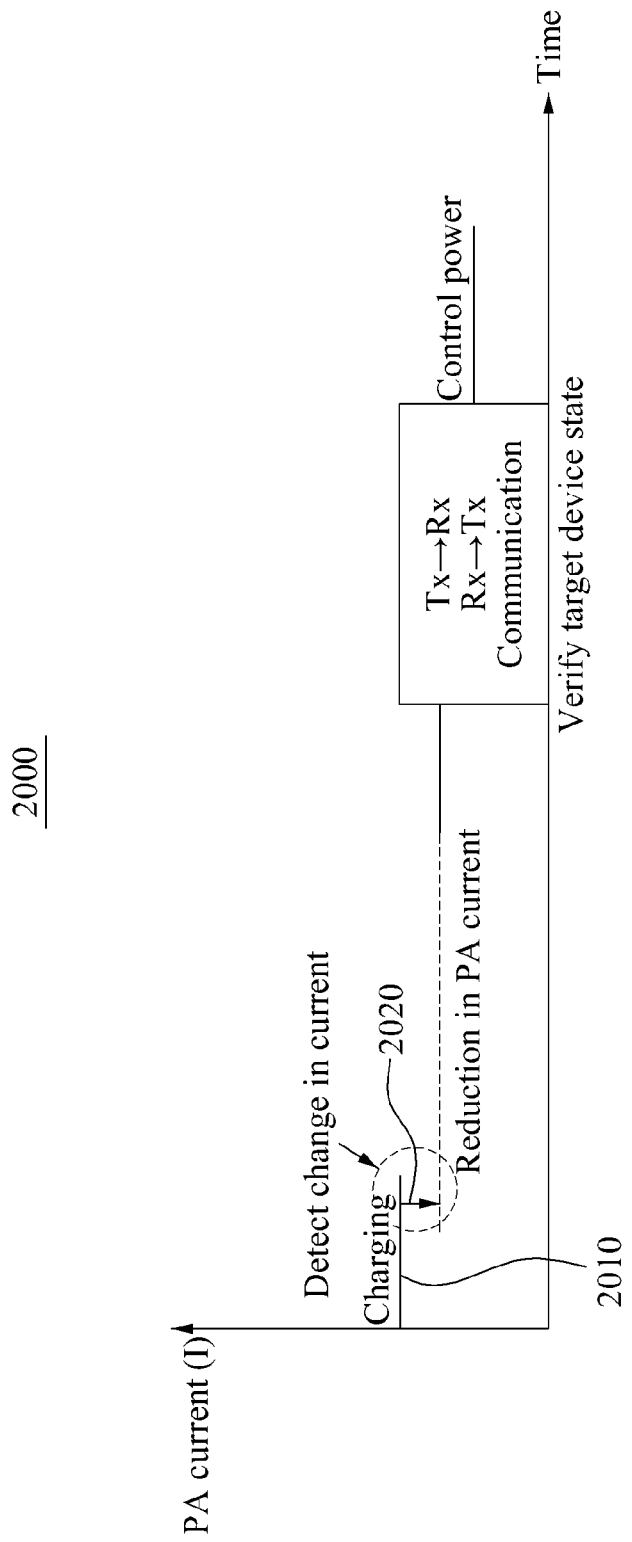
FIG. 20 is a diagram illustrating an example in which a mode of a single target device is changed during charging of the single target device.

FIG. 20 illustrates an example in which a mode of a single target device is changed during charging of the single target device.

In graph 2000 of FIG. 20, an x-axis represents time and a y-axis represents PA current. The graph 2000 shows a level 2010 of detected PA current, and a point 2020 at which a change in PA current within a predetermined level is detected. A level of initially detected PA current may indicate that the target device 520 is being charged. At the point 2020, the PA current is reduced during charging of the target device 520. The reduced PA current may indicate a CC mode reference current. Additionally, the graph 2000 shows a communication between the source device 510 and the target device 520.

The reduced PA current may correspond to a target load that occurs in response to the charging mode of the target device 520 being changed from the CC mode to the CV mode. In other words, the reduced PA current may correspond to a target load in the CV mode.

For example, if the source device 510 is in a single target device charging mode, the control/communication unit 710 may detect a reduction in the PA current in operation 1420. In this example, the reduced PA current may correspond to a load 890 in the CV mode. In operation 1440, the target device state received by the control/communication unit 710 may indicate that the target device 520 is in the CV mode, or that the target device 520 is changed from the CC mode to the CV mode. In operation 1460, the control/communication unit 710 may control the PA power, to control the operation for the wireless power transmission.

Figure 21:
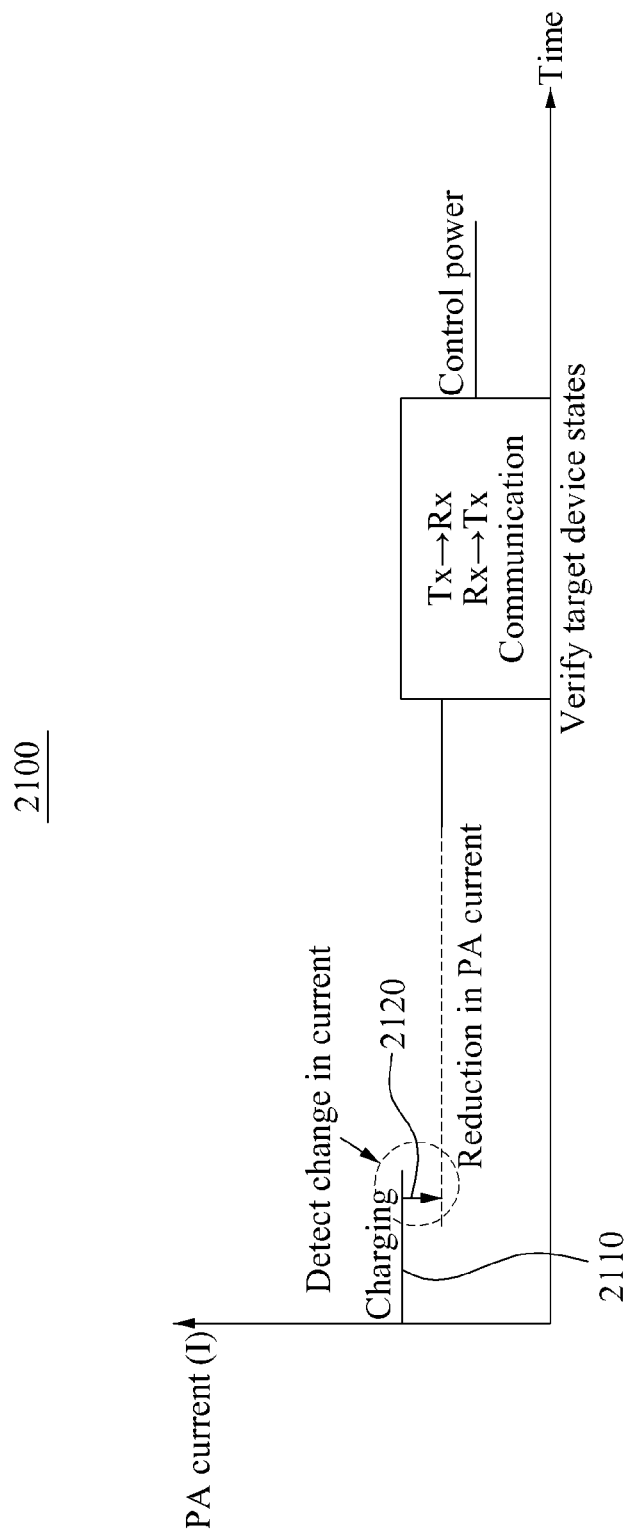
FIG. 21 is a diagram illustrating an example in which a mode of each of multiple target devices is changed during charging of the multiple target devices.

FIG. 21 illustrates an example in which a mode of each of multiple target devices is changed during charging of the multiple target devices.

In graph 2100 of FIG. 21, an x-axis represents time and a y-axis represents PA current. The graph 2100 shows a level 2110 of detected PA current, and a point 2120 at which a change in PA current within a predetermined level is detected. A level of initially detected PA current may indicate that a plurality of target devices 520 are being charged. Additionally, the graph 2100 shows a communication between the source device 510 and the plurality of target devices 520.

If a state of at least one of the plurality of target devices 520 changes, the PA current may be reduced at the point 2120. For example, at least one target device 520 may be removed or completely charged, or at least one mode of the at least one target device 520 may be changed to from the CC mode to the CV mode. The reduced PA current may correspond to a sum of target loads of target devices 520 of which states are changed. In other words, the control/communication unit 710 may detect a reduction in the PA current in operation 1420.

In operation 1430, the control/communication unit 710 may request each of the plurality of target devices 520 to transmit target device states of the respective target devices 520. To identify different target device states of the target devices 520, the control/communication unit 710 may also request the target devices 520 to transmit IDs of the target devices 520.

In operation 1440, the control/communication unit 710 may receive the target device states from the target devices 520, respectively. If a state of a specific target device is not received after a predetermined period of time elapses, the control/communication unit 710 may determine that there is no response from the specific target device.

In operation 1450, the control/communication unit 710 may verify the received target device states. In operation 1460, the control/communication unit 710 may determine the state of the wireless power transmission, based on the detected change in the PA current, or the detected target load, and based on the target device states.

Figure 22:
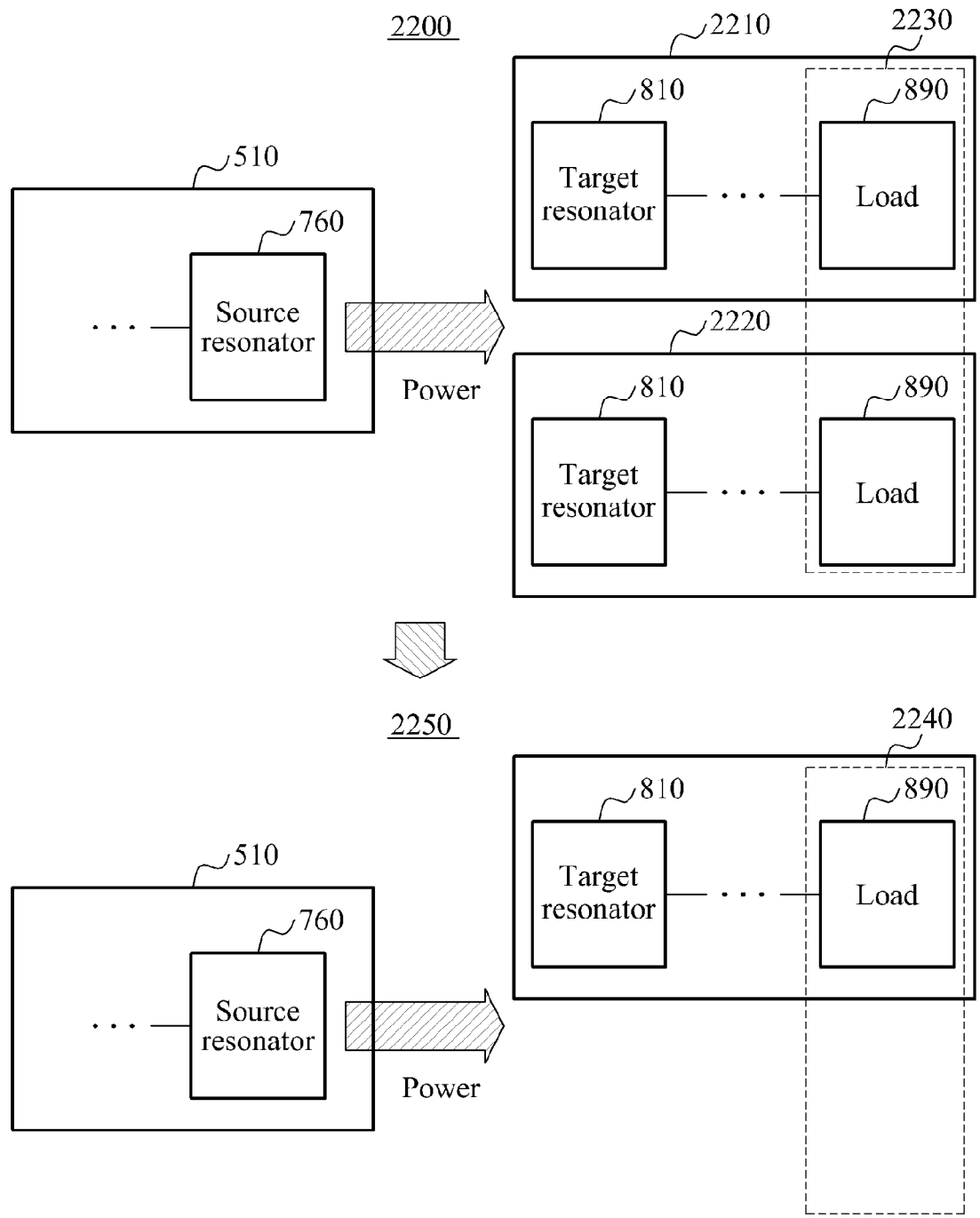
FIG. 22 is a diagram illustrating an example in which a load is removed during charging of multiple target devices.

FIG. 22 illustrates an example in which a load is removed during charging of multiple target devices.

Referring to FIG. 22, in a state 2200, two target devices 2210 and 2220 are being charged by the source device 510. In other words, the source device 510 is in a multi-terminal charging mode to charge a plurality of target devices. A total load 2230 (or a target load) may be obtained by summing up a load 890 of the target device 2210 and a load 890 of the target device 2220. For example, if both the loads 890 correspond to 3 W, the total load 2230 is 6 W.

In a state 2250, the target device 2220 is removed. Due to removal of the target device 2220, the total load 2230 is reduced to 3 W, indicating a total load 2240.

The control/communication unit 710 may determine whether a part of, or all of the plurality of target devices 520 are still present, by setting a reference value of the PA current. In other words, the control/communication unit 710 may determine whether the target devices 520 are still present, based on the PA current. For example, if the PA power is reduced, the control/communication unit 710 may determine states of the target devices 520, based on the level to which the PA power is reduced.

Figure 23:
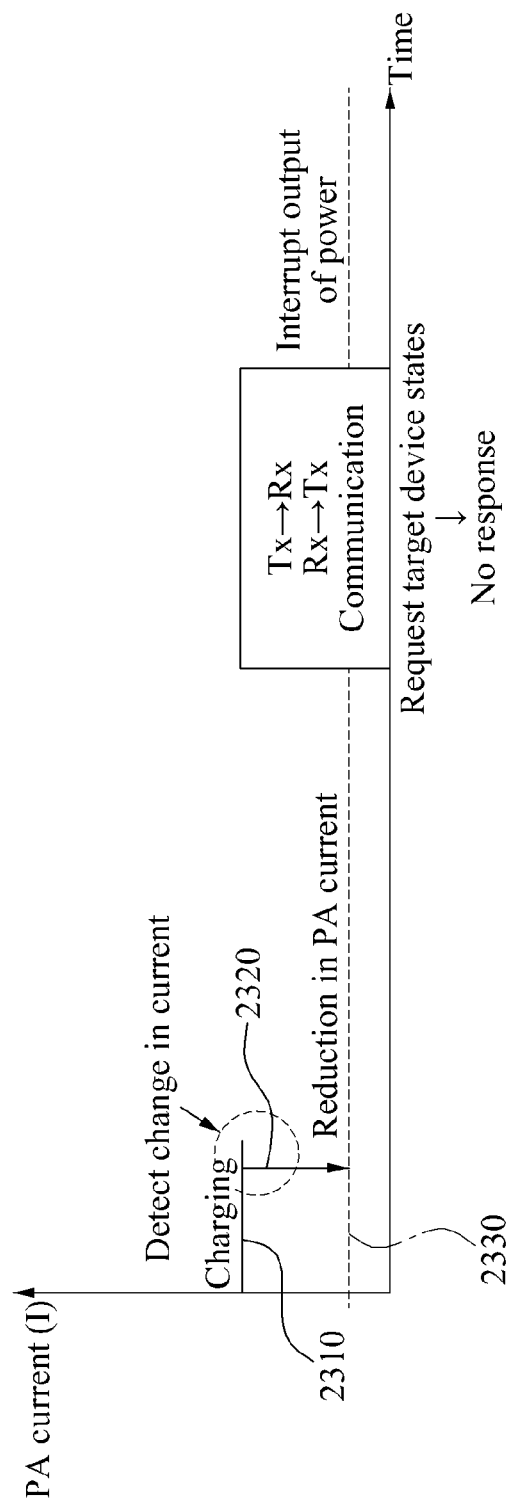
FIG. 23 is a diagram illustrating an example in which target devices are removed during charging of the multiple target devices.

FIG. 23 illustrates an example in which target devices are removed during charging of the multiple target devices.

In graph 2300 of FIG. 23, an x-axis represents time and a y-axis represents PA current. The graph 2300 shows a level 2310 of detected PA current, and a point 2320 at which a change in PA current within a predetermined level is detected. At the point 2320, the PA current is reduced during charging of a plurality of target devices 520. Additionally, the graph 2300 shows a communication between the source device 510 and the target devices 520.

The reduced PA current may correspond to a target load occurring when all of the target devices 520 are removed. For example, the PA current reduced in the point 2320 may be a current that represents that there is no charging load (or target load). Additionally, the reduced PA current may indicate a reference current indicating removal of a target device. In operation 1420, the control/communication unit 710 may detect that the PA current is reduced to a current corresponding to the target load that occurs if all of the target devices 520 are removed.

Because the target devices 520 are removed, a request for the target device states may not be transferred to the target devices 520 in operation 1430. The source device 510 may transmit, to each of the target devices 520, a command to transmit an ACK in response to the request, but a response to the command may not be received from the target devices 520. Additionally, in operation 1440, the target devices 520 may not transmit the target device states.

In operation 1460, the control/communication unit 710 may interrupt an output of the PA power. For example, if the PA current is changed to the current corresponding to a target load indicating that all of the target devices 520 are removed in operation 1430, and if the target device states are not received from the target devices 520 in operation 1440, the control/communication unit 710 may interrupt the output of the PA power, to control the operation for the wireless power transmission.

The above description with reference to FIGS. 22 and 23 may also be applied to an example in which charging of the plurality of target devices 520 is completed. For example, if the charging of the target devices 520 is completed, there may be no need to charge the target devices 520, and the source device 510 may determine that the target devices 520 are no longer in need of charging. In this example, each of the target devices 520 may transmit, to the control/communication unit 710, a notification of completion of the charging of the target devices 520 in operation 1440. In operation 1460, the control/communication unit 710 may interrupt the output of the PA power.

Figure 24:
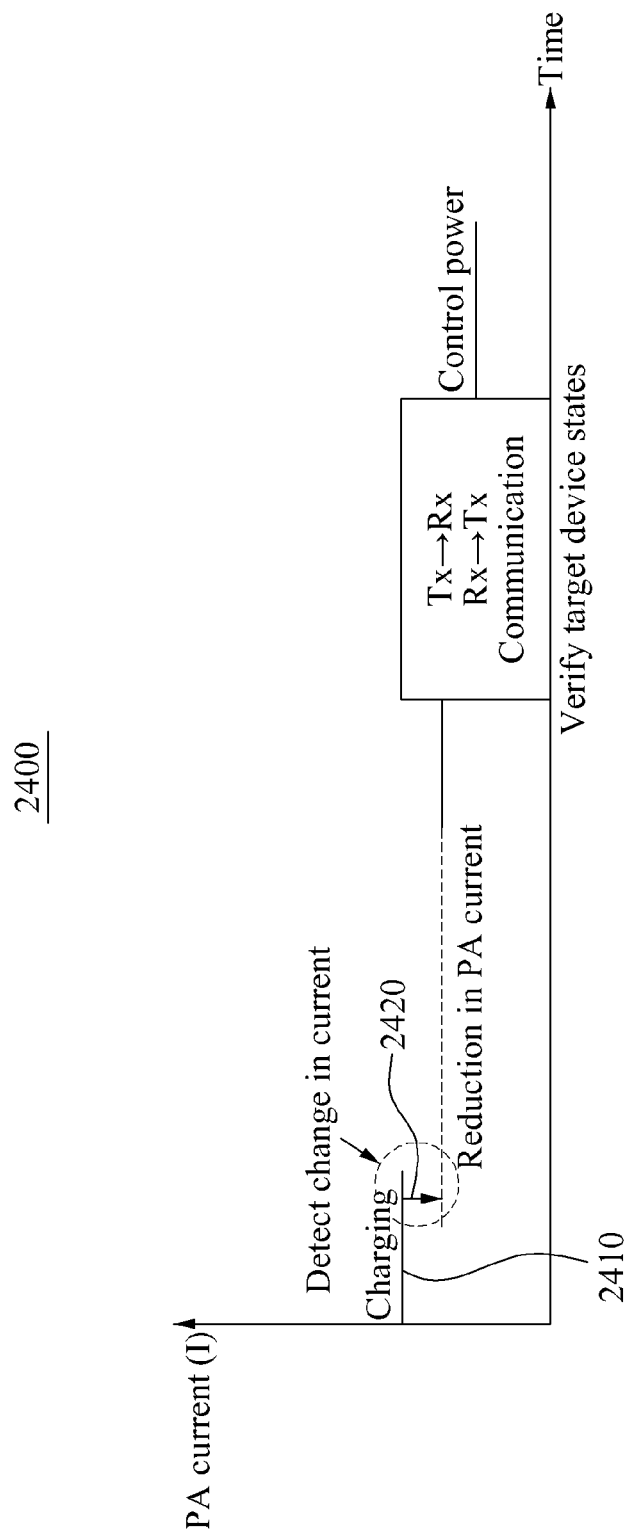
FIG. 24 is a diagram illustrating an example in which power amplifier (PA) current is reduced due to a change in charging state of at least one target device during charging of multiple target devices.

FIG. 24 illustrates an example in which PA current is reduced due to a change in charging state of at least one target device during charging of multiple target devices.

In graph 2400 of FIG. 24, an x-axis represents time and a y-axis represents PA current. The graph 2400 shows a level 2410 of detected PA current, and a point 2420 at which a change in PA current within a predetermined level is detected.

A level of initially detected PA current may indicate that a plurality of target devices 520 are being charged. At the point 2420, the PA current is reduced during charging of the plurality of target devices 520. Additionally, the graph 2400 shows a communication between the source device 510 and the plurality of target devices 520.

The reduced PA current may indicate that a charging mode of at least one target device 520 is changed. In other words, the reduced PA current may correspond to a target load that is changed due to a change in charging mode of at least one of the plurality of target devices 520.

For example, if the source device 510 is in a multi-target device charging mode, the control/communication unit 710 may detect a reduction in the PA current or in the PA power in operation 1420. The control/communication unit 710 may be aware that a mode of one of the plurality of target devices 520 is changed to the CV mode, or that another target device is completely charged. Accordingly, in operations 1420 through 1440, the control/communication unit 710 may communicate with the plurality of target devices 520, and may verify a target device state of each of the plurality of target devices 520.

In operation 1440, target device states received by the control/communication unit 710 may indicate at least one of the following four states. In the first state, one or more of the plurality of target devices 520 may have a change in charging mode from the CC mode to the CV mode. In the second state, all of the plurality of target devices 520 may change in charging mode from the CC mode to the CV mode. In the third state, at least one target device 520 may be removed from among the plurality of target devices 520. In the fourth state, at least one of the plurality of target devices 520 may be completely charged.

In operation 1460, the control/communication unit 710 may control the PA power based on the verified target device states, to control the operation for the wireless power transmission.

For example, the control/communication unit 710 may transmit an OFF command to a completely charged target device 520 among the plurality of target devices 520, so that power may not be transmitted to the completely charged target device 520.

Figure 25:
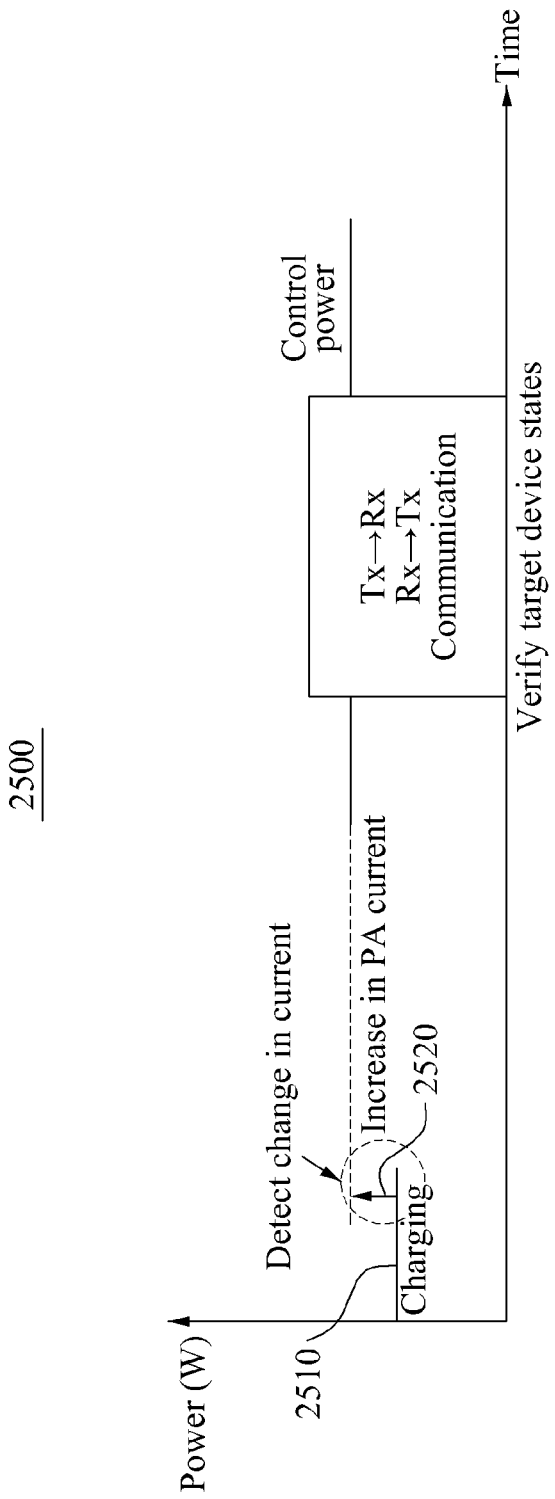
FIG. 25 is a diagram illustrating an example in which PA current is increased during charging of multiple target devices.

FIG. 25 illustrates an example in which PA current is increased during charging of multiple target devices.

In graph 2500 of FIG. 25, an x-axis represents time and a y-axis represents power. The graph 2500 shows a level 2510 of detected PA current, and a point 2520 at which a change in PA current within a predetermined level is detected.

A level of initially detected PA current may indicate that a plurality of target devices 520 are being charged. At the point 2520, the PA current increases during charging of the plurality of target devices 520. Additionally, the graph 2500 shows a communication between the source device 510 and the plurality of target devices 520.

The increased PA current may indicate that a target device 520 is added. In other words, the increased PA current may correspond to a target load that has changed due to an addition of at least one target device 520 to the plurality of target devices 520.

If the source device 510 is in the multi-target device charging mode, the control/communication unit 710 may detect an increase in the PA current or in the PA power in operation 1420. The control/communication unit 710 may be aware that the target device 520 is added, based on the increased PA current. Accordingly, in operations 1420 through 1440, the control/communication unit 710 may communicate with the plurality of target devices 520 to which the target device 520 is added, and may verify an ID and a target device state of each of the plurality of target devices 520.

The control/communication unit 710 may determine, based on the target device states, whether each of the plurality of target devices 520 exists, and information about an amount of desired power. The control/communication unit 710 may assign a control ID to each of the plurality of target devices 520 to which the target device 520 is added, so as to control each of the plurality of target devices 520.

In operation 1460, the control/communication unit 710 may control the PA power so that power may be supplied to the added target device 520, in order to control the operation for the wireless power transmission.

Figure 26:
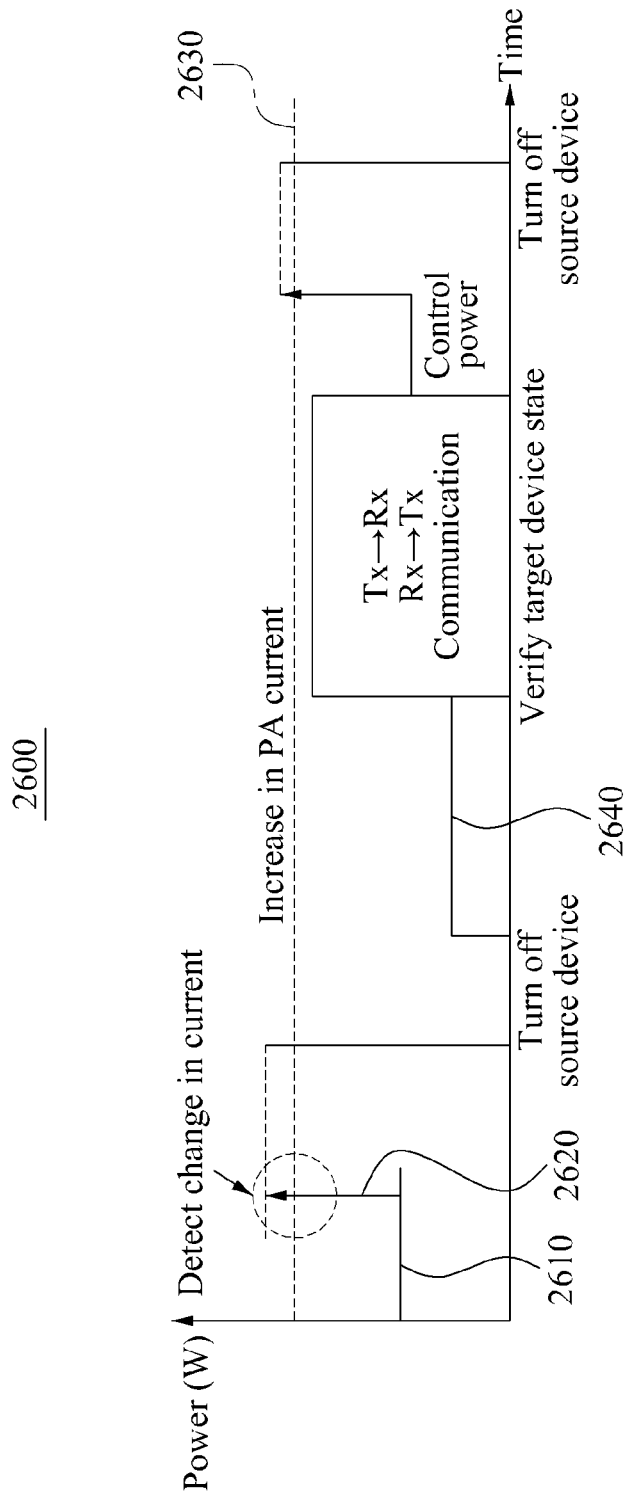
FIG. 26 is a diagram illustrating an example in which overcurrent occurs during charging of a target device.

FIG. 26 illustrates an example in which overcurrent occurs during charging of a target device.

In graph 2600 of FIG. 26, an x-axis represents time and a y-axis represents power. The graph 2600 shows a level 2610 of detected PA current, and a point 2620 at which a change in PA current within a predetermined level is detected. At the point 2620, the PA current increases above an overcurrent level 2630 during charging of at least one target device 520. Additionally, the graph 2600 shows a level 2640 of PA current detected when the source device 510 controls the target device 520, and shows a communication between the source device 510 and the target device 520.

For example, the overcurrent level 2630 may be set based on at least one of a purpose of preventing a breakdown of the source device 510, a purpose of preventing overcurrent of the PA 750, and a purpose of maintaining a system reliability of the source device 510.

In operation 1420, the control/communication unit 710 may detect that the PA current has increased above the overcurrent level 2630. Additionally, the control/communication unit 710 may turn off the source device 510 or the PA 750 for a predetermined period of time, to prevent the breakdown of the source device 510, or to prevent overcurrent of the PA 750, or to maintain the system reliability of the source device 510.

After the predetermined period of time elapses, the control/communication unit 710 may communicate with at least one target device 520, and may verify a target device state of each of the at least one target device 520 in operations 1420 through 1440.

In operation 1460, the control/communication unit 710 may control the PA power based on the verified target device state, to control the operation for the wireless power transmission. For example, if the controlled PA current is equal to or greater than the overcurrent level 2630, the control/communication unit 710 may turn off the source device 510 or the PA 750, and may change a mode of the at least one target device 520 to a safety mode.

Figure 27:
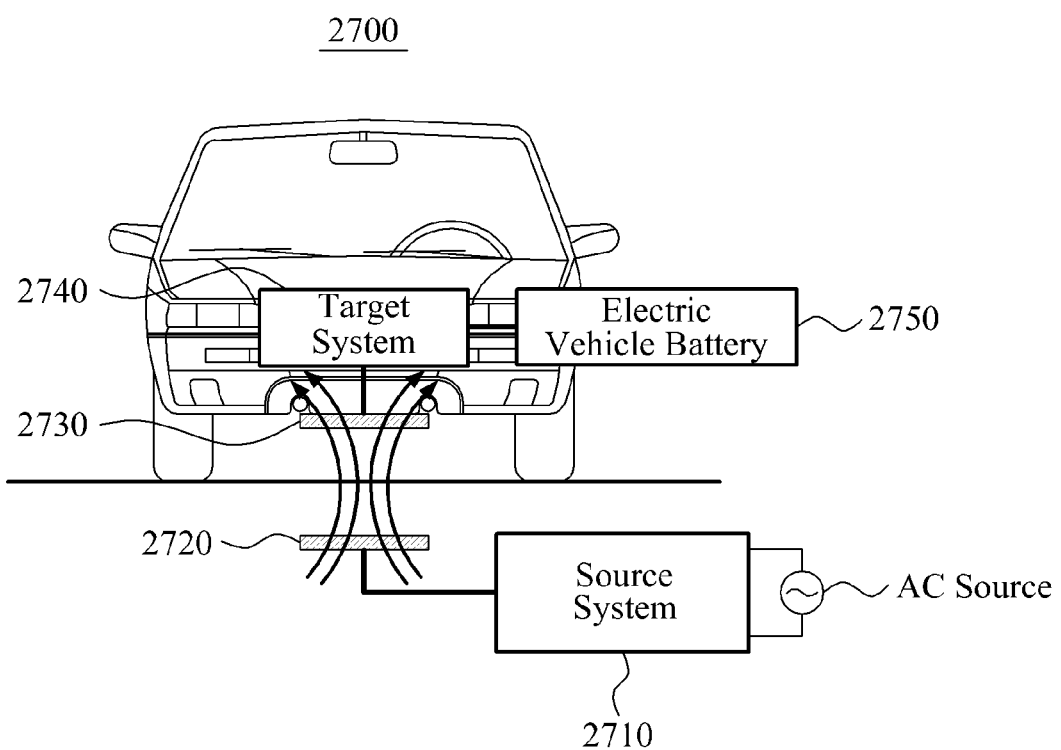
FIG. 27 is a diagram illustrating an example of an electric vehicle charging system.

FIG. 27 illustrates an example of an electric vehicle charging system.

Referring to FIG. 27, an electric vehicle charging system 2700 includes a source system 2710, a source resonator 2720, a target resonator 2730, a target system 2740, and an electric vehicle battery 2750.

The electric vehicle charging system 2700 may have a similar structure to the wireless power transmission and charging system of FIG. 1. The source system 2710 and the source resonator 2720 in the electric vehicle charging system 2700 may function as a source. Additionally, the target resonator 2730 and the target system 2740 in the electric vehicle charging system 2700 may function as a target.

The source system 2710 may include an AC/DC converter, a power detector, a power converter, a control/communication unit, similarly to the source device 110 of FIG. 1. The target system 2740 may include a rectification unit, a DC/DC converter, a switch unit, a charging unit, and a control/communication unit, similarly to the target device 120 of FIG. 1.

The electric vehicle battery 2750 may be charged by the target system 2740.

The electric vehicle charging system 2700 may use a resonant frequency in a band of a few kilohertz (KHz) to tens of MHz.

The source system 2710 may generate power, based on a type of charging vehicle, a capacity of a battery, and a charging state of a battery, and may supply the generated power to the target system 2740.

The source system 2710 may control the source resonator 2720 and the target resonator 2730 to be aligned. For example, when the source resonator 2720 and the target resonator 2730 are not aligned, the control/communication unit of the source system 2710 may transmit a message to the target system 2740, and may control alignment between the source resonator 2720 and the target resonator 2730.

For example, when the target resonator 2730 is not located in a position enabling maximum magnetic resonance, the source resonator 2720 and the target resonator 2730 may not be aligned. When a vehicle does not stop accurately, the source system 2710 may induce a position of the vehicle to be adjusted, and may control the source resonator 2720 and the target resonator 2730 to be aligned.

The source system 2710 and the target system 2740 may transmit or receive an ID of a vehicle, or may exchange various messages, through communication.

The descriptions of FIGS. 2 through 22 may be applied to the electric vehicle charging system 2700. However, the electric vehicle charging system 2700 may use a resonant frequency in a band of a few KHz to tens of MHz, and may transmit power that is equal to or higher than tens of watts to charge the electric vehicle battery 2750.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter, comprising:
a controller configured to determine an output power;
a power converter configured to output the output power;
a resonator configured to wirelessly transmit the output power to a target device; and
a power detector configured to detect a current of the output power,
wherein the controller is further configured to detect a change in the current using the power detector, determine a state of a wireless power transmission based on the detected change in the current, and control an operation for the wireless power transmission to the target device based on the determined state of the wireless power transmission.

2. The wireless power transmitter of claim 1, wherein the controller is further configured to receive a state of the target device from the target device, and to determine the state of wireless power transmission based on the detected change in the current and the received state of the target device.

3. The wireless power transmitter of claim 1, wherein, in response to the current being changed within a predetermined period of time, the controller determines that the current remains unchanged.

4. The wireless power transmitter of claim 1, wherein, in response to the current being changed within a predetermined range, the controller determines that the current remains unchanged.

5. The wireless power transmitter of claim 1, wherein, in response to the current being changed for more than a predetermined period of time, the controller is configured to request the target device to transmit a state of the target device.

6. The wireless power transmitter of claim 2, wherein the controller is configured to control the operation of the wireless power transmission by adjusting the output power based on the received state of the target device.

7. The wireless power transmitter of claim 1, wherein, in response to the current being changed to a current corresponding to a load indicating that the target device has been removed, the controller controls the operation for the wireless power transmission by interrupting an output of the output power.

8. The wireless power transmitter of claim 2, wherein, in response to the current corresponding to a load that occurs when the target device has changed from a constant current (CC) mode to a constant voltage (CV) mode, or if the received state of the target device indicates that the target device has changed from the CC mode to the CV mode, the controller controls the operation for the wireless power transmission by reducing the output power.

9. The wireless power transmitter of claim 1, wherein a plurality of target devices are provided, the controller receives states of the plurality of target devices, respectively, from the plurality of target devices, and determines the state of the wireless power transmission based on the received states and the change in the current.

10. The wireless power transmitter of claim 9, wherein, in response to the current being reduced, and
    in response to the received states of the target devices comprising at least one of a state indicating that a part of, or all of the target devices are changed in charging state from a constant current (CC) mode to a CV mode, a state indicating that at least one target device is removed from among the target devices, and a state indicating that at least one target device among the target devices is completely charged,
    the controller controls the operation for the wireless power transmission by reducing the output power that is transmitted to the target devices.

11. The wireless power transmitter of claim 9, wherein, in response to the current being increased and a target device being added to the target devices, the controller controls the operation for the wireless power transmission by increasing the output power so that the output power is transmitted to the added target device.

12. A method of controlling a wireless power transmission, the method comprising:
    wirelessly transmitting an output power to a target device;
    detecting a change in a current of the output power;
    determining a state of a wireless power transmission based on the detected change in the current; and
    controlling an operation for the wireless power transmission based on the determined state of the wireless power transmission.

13. The method of claim 12, further comprising receiving a state of the target device from the target device, wherein the determining comprises determining the state of the wireless power transmission based on the detected change in the current and the received state of the target device.

14. The method of claim 12, wherein, in response to the current being changed within a predetermined period of time, the current is determined to remain unchanged.

15. The method of claim 12, wherein, in response to the current being changed within a predetermined range, the current is determined to remain unchanged.

16. The method of claim 12, further comprising:
    requesting the target device to transmit a state of the target device, in response to the current being changed for more than a predetermined period of time.

17. The method of claim 14, wherein the controlling comprises adjusting the output power based on the received state of the target device.

18. The method of claim 12, wherein the controlling comprises interrupting an output of the output power, in response to the current being changed to a current corresponding to a load indicating that the target device has been removed.

19. The method of claim 14, wherein, in response to the current corresponding to a load that occurs when the target device has changed from a constant current (CC) mode to a constant voltage (CV) mode, or if the received state of the target device indicates that the target device has changed from the CC mode to the CV mode,
    the controlling comprises controlling the operation for the wireless power transmission by reducing the output power.

20. The method of claim 12, wherein a plurality of target devices are provided, the receiving comprises receiving states of the plurality of target devices, respectively, from the plurality of target devices, and the determining comprises determining the state of the wireless power transmission based on the received states and the change in the current.

21. The method of claim 20, wherein, in response to the current being reduced, and
    in response to the states of the target devices comprising at least one of a state indicating that a part of, or all of the target devices are changed in charging state from a constant current (CC) mode to a CV mode, a state indicating that at least one target device is removed from among the target devices, and a state indicating that at least one target device among the target devices is completely charged,
    the controlling comprises controlling the operation for the wireless power transmission by reducing the output power.

22. The method of claim 20, wherein, in response to the current being increased, and a target device being added to the target devices, the controlling comprises increasing the output power so that the output power is transmitted to the added target device.

23. A computer-readable storage medium having stored therein instructions to cause a processor to implement a method of controlling a wireless power transmission, the method comprising:
    wirelessly transmitting an output power to a target device;
    detecting a change in a current of the output power;
    determining a state of a wireless power transmission based on the detected change in the current; and
    controlling an operation for the wireless power transmission based on the determined state of the wireless power transmission.

* * * * *